US012142921B2

(12) United States Patent
Lemsaddek et al.

(10) Patent No.: US 12,142,921 B2
(45) Date of Patent: Nov. 12, 2024

(54) AGGREGATION PLATFORM FOR INTELLIGENT LOCAL ENERGY MANAGEMENT SYSTEM

(71) Applicant: Nuvve Corporation, San Diego, CA (US)

(72) Inventors: Hamza Lemsaddek, San Diego, CA (US); Gregory Poilasne, San Diego, CA (US)

(73) Assignee: Nuvve Corporation, San Diego, CA (US)

( * ) Notice: Subject to any disclaimer, the term of this patent is extended or adjusted under 35 U.S.C. 154(b) by 0 days.

(21) Appl. No.: 18/316,938

(22) Filed: May 12, 2023

(65) Prior Publication Data

US 2023/0420941 A1 Dec. 28, 2023

Related U.S. Application Data

(63) Continuation of application No. 17/655,722, filed on Mar. 21, 2022, now Pat. No. 11,695,274.

(51) Int. Cl.
*H02J 3/14* (2006.01)
*G06Q 50/06* (2024.01)
(Continued)

(52) U.S. Cl.
CPC ............. *H02J 3/144* (2020.01); *H02J 3/003* (2020.01); *H02J 3/322* (2020.01); *G06Q 50/06* (2013.01)

(58) Field of Classification Search
CPC ............ H02J 3/144; H02J 3/003; H02J 3/322; G06Q 50/06
See application file for complete search history.

(56) References Cited

U.S. PATENT DOCUMENTS 4,617,506 A 10/1986 Bogie et al.
4,770,841 A 9/1988 Haley
(Continued)

FOREIGN PATENT DOCUMENTS

CA 2697015 A1 1/2009
CN 1405944 A 3/2003
(Continued)

OTHER PUBLICATIONS

Guille et al., "A conceptual framework for the vehicle-to-grid (V2G) implementation," Energy Policy, vol. 37, Issue 11, Nov. 2009, pp. 4379-4390.
(Continued)

*Primary Examiner* — Ziaul Karim
(74) *Attorney, Agent, or Firm* — Snell & Wilmer L.L.P

(57) ABSTRACT

Certain aspects of the present disclosure relate to a local energy management system (LEMS) at local mixed power generating sites for providing grid services and grid service applications. The LEMS generally serves as a local power control agent for facilitating energy management at the local site level by controlling and leveraging a plurality of local assets deployed at the local site, and combining a plurality of generated power from each site which acts as its own virtual power plant for delivering grid services to the grid. In addition, the LEMS has the ability to effectively handle and fulfill energy and electrical objectives of the grid services, including regulation or demand response objectives from the grid, by conveying operational set points that control the power charge and discharge at each local asset in order to meet those objectives.

18 Claims, 26 Drawing Sheets

(51) Int. Cl.
*H02J 3/00* (2006.01)
*H02J 3/32* (2006.01)

(56) References Cited

U.S. PATENT DOCUMENTS

| | | | |
|---|---|---|---|
| 5,499,181 A | 3/1996 | Smith | |
| 5,572,109 A | 11/1996 | Keith | |
| 5,583,418 A | 12/1996 | Honda | |
| 5,598,084 A | 1/1997 | Keith | |
| 5,767,584 A | 6/1998 | Gore et al. | |
| 6,028,537 A | 2/2000 | Suman et al. | |
| 6,081,205 A | 6/2000 | Williams | |
| 6,087,806 A | 7/2000 | Fujioka | |
| 6,107,691 A | 8/2000 | Gore et al. | |
| 6,356,877 B1 | 3/2002 | Schulden | |
| 6,614,204 B2 | 9/2003 | Pellegrino et al. | |
| 6,925,361 B1 | 8/2005 | Sinnock | |
| 7,013,205 B1 | 3/2006 | Hafner et al. | |
| 7,040,430 B2 | 5/2006 | Nomura | |
| 7,274,975 B2 | 9/2007 | Miller | |
| 7,443,049 B1 | 10/2008 | Jones et al. | |
| 7,550,861 B2 | 6/2009 | Oyobe | |
| 7,565,224 B2 | 7/2009 | Fairlie | |
| 7,582,979 B2 | 9/2009 | Oyobe | |
| 7,590,472 B2 | 9/2009 | Hakim et al. | |
| 7,612,466 B2 | 11/2009 | Skutt | |
| 7,740,092 B2 | 6/2010 | Bender | |
| 7,783,390 B2 | 8/2010 | Miller | |
| 7,792,613 B2* | 9/2010 | Kressner | B60L 53/305 |
| | | | 700/286 |
| 8,019,483 B2 | 9/2011 | Keefe | |
| 8,116,915 B2 | 2/2012 | Kempton et al. | |
| 8,154,246 B1 | 4/2012 | Heitmann | |
| 8,508,187 B2 | 8/2013 | Chiang et al. | |
| 8,509,976 B2 | 8/2013 | Kempton et al. | |
| 9,043,038 B2 | 5/2015 | Kempton | |
| 9,754,300 B2 | 9/2017 | Kempton et al. | |
| 11,695,274 B1 | 7/2023 | Lemsaddek et al. | |
| 11,747,781 B1 | 9/2023 | Lemsaddek et al. | |
| 2004/0110044 A1* | 6/2004 | McArthur | B60L 58/40 |
| | | | 429/443 |
| 2005/0107989 A1* | 5/2005 | Henriksen | G05B 23/0221 |
| | | | 702/188 |
| 2006/0250902 A1 | 11/2006 | Bender et al. | |
| 2007/0068714 A1 | 3/2007 | Bender | |
| 2007/0271006 A1 | 11/2007 | Golden et al. | |
| 2007/0282495 A1 | 12/2007 | Kempton et al. | |
| 2008/0039980 A1 | 2/2008 | Pollack et al. | |
| 2008/0040295 A1* | 2/2008 | Kaplan | B60L 53/64 |
| | | | 705/412 |
| 2008/0052145 A1* | 2/2008 | Kaplan | B60L 53/665 |
| | | | 705/7.31 |
| 2008/0167756 A1 | 7/2008 | Golden et al. | |
| 2008/0218104 A1 | 9/2008 | Lukic et al. | |
| 2008/0281663 A1 | 11/2008 | Hakim et al. | |
| 2009/0030712 A1 | 1/2009 | Bogolea et al. | |
| 2009/0062967 A1 | 3/2009 | Kressner et al. | |
| 2009/0088915 A1 | 4/2009 | Kizaki | |
| 2009/0091291 A1 | 4/2009 | Woody et al. | |
| 2009/0177595 A1 | 7/2009 | Dunlap et al. | |
| 2009/0189456 A1 | 7/2009 | Skutt | |
| 2009/0210357 A1 | 8/2009 | Pudar et al. | |
| 2009/0222143 A1 | 9/2009 | Kempton | |
| 2009/0224939 A1 | 9/2009 | Stocker et al. | |
| 2009/0228388 A1 | 9/2009 | Axelrod et al. | |
| 2009/0229900 A1 | 9/2009 | Hafner | |
| 2009/0259603 A1 | 10/2009 | Housh | |
| 2009/0313033 A1 | 12/2009 | Hafner | |
| 2009/0313103 A1 | 12/2009 | Ambrosio et al. | |
| 2010/0017045 A1 | 1/2010 | Nesler et al. | |
| 2010/0017249 A1 | 1/2010 | Fincham et al. | |
| 2010/0114798 A1 | 5/2010 | Sirton | |
| 2010/0161393 A1 | 6/2010 | Littrell | |
| 2010/0161481 A1 | 6/2010 | Littrell | |
| 2010/0211643 A1 | 8/2010 | Lowenthal et al. | |
| 2010/0274570 A1 | 10/2010 | Proefke et al. | |
| 2011/0001356 A1 | 1/2011 | Pollack | |
| 2011/0099111 A1 | 4/2011 | Levy et al. | |
| 2011/0202192 A1 | 8/2011 | Kempton | |
| 2011/0202217 A1* | 8/2011 | Kempton | H02J 3/008 |
| | | | 320/109 |
| 2011/0276194 A1 | 11/2011 | Emalfarb et al. | |
| 2012/0029720 A1* | 2/2012 | Cherian | H02J 13/00 |
| | | | 700/297 |
| 2012/0089523 A1 | 4/2012 | Hurri et al. | |
| 2012/0253567 A1 | 10/2012 | Levy et al. | |
| 2013/0039104 A1 | 2/2013 | Sharma | |
| 2013/0113413 A1 | 5/2013 | Harty | |
| 2014/0018969 A1* | 1/2014 | Forbes, Jr. | H02J 3/322 |
| | | | 700/295 |
| 2014/0039709 A1* | 2/2014 | Steven | H02J 13/00034 |
| | | | 700/291 |
| 2014/0067151 A1 | 3/2014 | Erhart et al. | |
| 2014/0304025 A1 | 10/2014 | Steven et al. | |
| 2014/0312841 A1 | 10/2014 | Baba | |
| 2015/0278968 A1 | 10/2015 | Steven et al. | |
| 2016/0248263 A1 | 8/2016 | Hunt et al. | |
| 2017/0205865 A1 | 7/2017 | Hwang et al. | |
| 2018/0037121 A1 | 2/2018 | Narla | |
| 2018/0239318 A1 | 8/2018 | Hwang et al. | |
| 2019/0050949 A1* | 2/2019 | Orsini | H02J 3/381 |
| 2019/0184850 A1 | 6/2019 | Lee et al. | |
| 2019/0288347 A1 | 9/2019 | Yokoyama et al. | |
| 2020/0023747 A1* | 1/2020 | Logvinov | B60L 53/305 |
| 2020/0059097 A1 | 2/2020 | Bangalore et al. | |
| 2020/0307402 A1* | 10/2020 | Poilasne | H02J 3/322 |
| 2021/0011439 A1 | 1/2021 | Goverde et al. | |
| 2021/0316637 A1 | 10/2021 | Slepchenkov et al. | |
| 2022/0043038 A1 | 2/2022 | Matan et al. | |
| 2022/0383429 A1 | 12/2022 | Poilasne et al. | |

FOREIGN PATENT DOCUMENTS

| | | |
|---|---|---|
| CN | 106203720 A | 12/2016 |
| JP | H07-123599 | 5/1995 |
| JP | 2003-259636 | 9/2003 |
| JP | 2003-259696 A | 9/2003 |
| JP | 2005-341646 A | 12/2005 |
| JP | 2006-279844 A | 10/2006 |
| JP | 2007-228695 A | 9/2007 |
| JP | 2007-252118 A | 9/2007 |
| JP | 2007-259600 A | 10/2007 |
| JP | 2007-330083 A | 12/2007 |
| JP | 2007-336778 A | 12/2007 |
| JP | 2008-054439 A | 3/2008 |
| JP | 2008-065635 | 3/2008 |
| JP | 2009-137456 A | 6/2009 |
| JP | 2009-183086 A | 8/2009 |
| JP | 2009-240150 A | 10/2009 |
| JP | 2009-254052 A | 10/2009 |
| JP | 2010-028913 A | 2/2010 |
| JP | 2010-512727 A | 4/2010 |
| KR | 2015-0022732 A | 3/2015 |
| WO | WO 2006/121761 A2 | 11/2006 |
| WO | WO 2007/037972 A2 | 4/2007 |
| WO | WO 2008/073453 A1 | 6/2008 |
| WO | WO 2008/073476 A2 | 6/2008 |
| WO | WO 2009/052446 A2 | 4/2009 |
| WO | WO 2011/102855 A1 | 8/2011 |
| WO | WO 2011/102856 A1 | 8/2011 |
| WO | WO 2018/084152 A1 | 5/2018 |
| WO | WO 2018/098400 A1 | 5/2018 |
| WO | WO 2019/153305 A1 | 8/2019 |
| WO | WO 2020/198689 A1 | 10/2020 |
| WO | WO 2022/256184 A1 | 12/2022 |

OTHER PUBLICATIONS

Kempton, William, "Electric Vehicles as a New Power Source for Electric Utilities," Transportation Research Part D: Transport and Environment, vol. 2, Issue 3, Sep. 1997, pp. 157-175.

(56) References Cited

OTHER PUBLICATIONS

Kempton et al., "Vehicle-to-Grid Power: Battery, Hybrid, and Fuel Cell Vehicles as Resources for Distributed Electric Power in California," Prepared for California Air Resources Board and the California Environmental Protection Agency (under contract #ARB00-612, "Feasability of Electric Drive Vehicles as Distributed Power Generation Assets in California"), and Los Angeles Department of Water and Power, Electric Transportation Program, in 94 pages.
Kempton et al., "Vehicle-to-grid power fundamentals: Calculating capacity and net revenue," Journal of Power Sources, vol. 144, Issue 1, Jun. 1, 2005, pp. 268-279.
Kempton et al., "Vehicle-to-grid power implementation: From stabilizing the grid to supporting large-scale renewable energy," Journal of Power Sources, vol. 144, Issue 1, Jun. 1, 2005, pp. 280-294.
Meng et al., "Dynamic frequency response from electric vehicles considering travelling behavior in the Great Britain power system," Applied Energy, vol. 162, Nov. 12, 2015, pp. 966-979.
SAE International, "SAE Electric Vehicle and Plug in Hybrid Electric Vehicle Conductive Charge Coupler," SAE Standard J1772TM Jan. 2010, Issued Oct. 1996, Revised Jan. 2010, in 51 pages.
Tomic et al., "Using fleets of electric-drive vehicles for grid support," Journal of Power Sources, vol. 168, Mar. 12, 2007, pp. 459-468.
Wei et al., "The effect of different charging strategies on EV load frequency control," 2016 International Conference on Smart Grid and Clean Energy Technologies, IEEE, Oct. 19, 2016, pp. 161-165.

\* cited by examiner

AGGREGATION PLATFORM FOR INTELLIGENT LOCAL ENERGY MANAGEMENT SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

INTRODUCTION

Aspects of the present disclosure relate to an intelligent local energy management system for managing, optimizing, and controlling a plurality or mixture of power generating systems at one or more local mixed power generating sites and providing grid services and grid applications.

An aggressive push towards 100% renewable energy in many parts of the country and world has paved the way for the adaptation and infrastructure of local clean energy systems such as solar, wind, and hydro power generating systems for use in commercial, household, and vehicle charging, electricity and heating applications. This push is clearly evident in the electric vehicle (EV) industry where demand for electric vehicles is expected to grow over the next several years, according to recent market research data. In turn, the demand and increase for public electric vehicle charging stations is also projected to increase over the next several of years. These public EV charging stations are generally equipped with EV chargers or electric vehicle supply equipment (EVSE), supplying electrical power for charging plug-in electric vehicles, including hybrid electric vehicles, full electric vehicles, and so on. Power to these EV charging stations is primarily fed by external power generating systems such as power supplied by the grid or other power generation systems which are capable of sustaining and delivering large amounts of power to these charging stations over local power lines and power cables.

While EVSE's are widely in use and deployed locally at the public EV charging stations, other types of power systems which can benefit and enhance both power and revenue generation capabilities at these local stations are generally not available especially at the local site level. For example, fixed energy storage (FES) systems are available as a back-up power resource to these charging stations but have not been widely adopted for other services such as grid services, despite potentially having a very large power capacity and its ability to store and supply power. This is likely because FES systems operate as single power sources that are deployed for a specific service where the entire capacity of the FES is dedicated to that specific service at the local site level.

Accordingly, there is a need for localized systems and methods for managing, controlling, and leveraging a plurality or mixture of power generating systems at one or more local sites so that such local systems may expand the power and revenue capabilities while offering grid services at the local site level.

SUMMARY

Certain implementations provide a method for 1) receiving, by a local energy management system (LEMS) communicatively coupled to an external entity, a mixture of local power generating assets at a local site, and a power grid, one or more energy or electrical objectives from the external entity, the mixture of local power generating assets are electrically coupled to the power grid; 2) receiving, by the LEMS, incoming raw data from the mixture of power generating assets; 3) generating, by the LEMS, one or more set points according to the one or more energy or electrical objectives and the incoming raw data; 4) conveying, by the LEMS, the one or more set points to the mixture of local power generating assets; 5) performing, by the mixture of local power generating assets, one or more grid services by meeting the one or more energy or electrical objectives; and 6) transferring, by the mixture of local power generating assets, power between the mixture of local power generating assets and the power grid.

In some aspects, the techniques described herein relate to a method, including: receiving, by a local energy management system (LEMS) communicatively coupled to an external entity, a mixture of local power generating assets at a local site, and a power grid, one or more energy or electrical objectives from the external entity, wherein the mixture of local power generating assets can be electrically coupled to the power grid; receiving, by the LEMS, incoming raw data from the mixture of power generating assets; generating, by the LEMS, one or more set points according to the one or more energy or electrical objectives and the incoming raw data; conveying, by the LEMS, the one or more set points to the mixture of local power generating assets; performing, by the mixture of local power generating assets, one or more grid services by meeting the one or more energy or electrical objectives; and transferring, by the mixture of local power generating assets, power between the mixture of local power generating assets and the power grid.

In some aspects, the method can further include transforming, by the LEMS, the incoming raw data into a structured protocol format via one or more protocol adapters.

In some aspects, the incoming raw data can include a plurality of input data and sensing data.

In some aspects, the external entity can include an aggregation platform, frequency meter, energy meter, or a third party system.

In some aspects, the mixture of local power generating assets can include a combination of electric vehicle station equipment (EVSEs), fixed energy storage systems (FES s), and/or local generation resources (LGRs).

In some aspects, each LGR can include solar, wind, and/or hydro power generating systems.

In some aspects, each fixed energy storage system can include batteries, battery packs, capacitors, and/or energy storage cells.

In some aspects, the method can further include transforming, by the LEMS, the one or more set points into one or more structured protocol formats, wherein the one or more structured protocol formats are adapted to be interpreted by one or more devices in the mixture of local power generating assets.

In some aspects, the method can further include automatically adjusting one or more operational power settings of a targeted system according to the one or more set points received by the targeted system, wherein the targeted system is a member of the mixture of local power generating assets.

In some aspects, the one or more operational power settings can be configured to control voltage, frequency, and current on the targeted system.

In some aspects, the external entity can be in communication with a plurality of local energy management systems disposed at different local sites, wherein each local energy management system can be configured to be communicatively coupled to a corresponding mixture of local power generating assets having a configured power topology.

In some aspects, the techniques described herein relate to a system, including: a local energy management system (LEMS) electrically coupled to a mixture of local power generating assets at a local site, a power grid, and an external entity, wherein the LEMS can be configured to: receive one or more energy or electrical objectives from the external entity; receive incoming raw data from the mixture of power generating assets; generate one or more set points according to the one or more energy or electrical objectives and the incoming raw data; and convey the one or more set points to the mixture of local power generating assets; wherein the mixture of local power generating assets can be configured to: perform one or more grid services for meeting the one or more energy or electrical objectives; and transfer power between the mixture of local power generating assets and the power grid.

In some aspects, the LEMS can be further configured to transform the incoming raw data into a structured protocol format via one or more protocol adapters.

In some aspects, the incoming raw data can include a plurality of input data and sensing data.

In some aspects, the external entity can include an aggregation platform, frequency meter, energy meter, or a third party system.

In some aspects, the mixture of local power generating assets can include a combination of electric vehicle station equipment (EVSEs), fixed energy storage systems (FES s), and/or local generation resources (LGRs).

In some aspects, each LGR can include solar, wind, and/or hydro power generating systems.

In some aspects, each fixed energy storage system can include batteries, battery packs, capacitors, and/or energy storage cells.

In some aspects, the LEMS can be configured to transform the one or more set points into one or more structured protocol formats, wherein the one or more structured protocol formats can be adapted to be interpreted by one or more devices in the mixture of local power generating assets.

In some aspects, the LEMS can be configured to automatically adjust one or more operational power settings of a targeted system according to the one or more set points received by the targeted system, wherein the targeted system can be a member of the mixture of local power generating assets.

In some aspects, the one or more operational power settings can be configured to control voltage, frequency, and current on the targeted system.

In some aspects, the external entity can be in communication with a plurality of local energy management systems disposed at different local sites, wherein each local energy management system can be configured to be electrically coupled to a corresponding mixture of local power generating assets having a predetermined power topology.

In some aspects, the techniques described herein relate to a local energy management system electrically coupled to a power grid, a plurality of local power generating assets at a local site, and an external entity, wherein the plurality of local power generating assets can be electrically coupled to the power grid. The system can include: a plurality of sensors configured to monitor the plurality of local power generating assets and output raw sensor data about the plurality of local power generating assets; one or more inputs configured to receive at least one or more energy or electrical objectives from the external entity; a control system configured to: receive the raw sensor data; receive the one or more energy or electrical objectives; generate one or more operating parameter set points of the plurality of power generating assets based on the one or more energy or electrical objectives and the raw sensor data; and output the one or more operating parameter set points to the plurality of local power generating assets, wherein one or more operating parameter settings of the plurality of local power generating assets can be configured to be adjusted according to the one or more operating parameter set points to meet the one or more energy or electrical objectives.

In some aspects, the control system can be further configured to transforming the raw sensor data into a structured protocol format via one or more protocol adapters.

In some aspects, the one or more inputs can be further configured to receive raw input data and the controller can be configured to generate the one or more operating parameter set points further based on the raw input data.

In some aspects, the external entity can include an aggregation platform, frequency meter, energy meter, or a third party system.

In some aspects, the plurality of local power generating assets can include one or more of an electric vehicle station equipment (EVSE), a fixed energy storage system (FESs), and/or a local generation resource (LGR).

In some aspects, the LGR can include a solar, wind, and/or hydro power generating system.

In some aspects, the fixed energy storage system can include batteries, battery packs, capacitors, and/or energy storage cells.

In some aspects, the system can be further configured to transform the one or more operating parameter set points into one or more structured protocol formats, wherein the one or more structured protocol formats can be configured to be interpreted by one or more devices in the plurality of local power generating assets.

In some aspects, the system can be further configured to automatically adjust the one or more operational parameter settings of a target member of the plurality of local power generating assets according to the one or more set points received by the target member.

In some aspects, the one or more operational parameter settings can be configured to control voltage, frequency, and/or current on the target member.

In some aspects, under the adjusted one or more operating parameter settings, the plurality of local power generating assets can be configured to transfer power between the plurality of local power generating assets and the power grid.

In some aspects, the external entity can be further in communication with a plurality of other local energy management systems disposed at other different local sites, wherein each of the other local energy management systems can be configured to be electrically coupled to a corresponding plurality of local power generating assets having a predetermined power topology.

In some aspects, the techniques described herein relate to a method of intelligently energy management at a local site using a local energy management system (LEMS) communicatively coupled to an external entity, a plurality of local power generating assets at a local site, and a power grid, wherein the plurality of local power generating assets can be electrically coupled to the power grid. The method can include: using a control system of the LEMS: receiving raw sensor data about the plurality of local power generating assets from a plurality of sensors of the LEMS; receiving at least one or more energy or electrical objectives from the external entity from one or more inputs of the LEMS; generating one or more operating parameter set points of the plurality of local power generating assets based on the one or more energy or electrical objectives and the raw sensor data; and outputting the one or more operating parameter set points to the plurality of local power generating assets, wherein one or more operating parameter settings of the plurality of local power generating assets are configured to be adjusted according to the one or more operating parameter set points to meet the one or more energy or electrical objectives.

In some aspects, the method can further include transforming the raw sensor data into a structured protocol format via one or more protocol adapters.

In some aspects, the one or more inputs can be further configured to receive raw input data and generating the one or more operating parameter set points can be further based on the raw input data.

In some aspects, the external entity can include an aggregation platform, frequency meter, energy meter, or a third party system.

In some aspects, the plurality of local power generating assets can include one or more of an electric vehicle station equipment (EVSE), a fixed energy storage system (FESs), and/or a local generation resource (LGR).

In some aspects, the LGR can include a solar, wind, and/or hydro power generating system.

In some aspects, the fixed energy storage system can include batteries, battery packs, capacitors, and/or energy storage cells.

In some aspects, the method can further include transforming the one or more operating parameter set points into one or more structured protocol formats, wherein the one or more structured protocol formats can be configured to be interpreted by one or more devices in the plurality of local power generating assets.

In some aspects, the method can further include automatically adjusting the one or more operational parameter settings of a target member of the plurality of local power generating assets according to the one or more set points received by the target member.

In some aspects, the one or more operational parameter settings can be configured to control voltage, frequency, and/or current on the target member.

In some aspects, under the adjusted one or more operating parameter settings, the plurality of local power generating assets can be configured to transfer power between the plurality of local power generating assets and the power grid.

In some aspects, the external entity can be further in communication with a plurality of other local energy management systems disposed at other different local sites, wherein each of the other local energy management systems can be configured to be electrically coupled to a corresponding plurality of local power generating assets having a predetermined power topology.

In some aspects, the techniques described herein relate to a method of intelligently managing and controlling grid services over one or more local power generation sites, the method including: under control of an electronic aggregation platform that is in electrical communication with a plurality of local power generating assets at a local site, wherein the plurality of local power generating assets can be electrically coupled to a power grid: receiving raw data about the plurality of local power generating assets at a present state; calculating one or more energy or electrical objectives for the local site based at least in part on the raw data at the present state; generating one or more operating parameter set points of the plurality of local power generating assets based on the one or more energy or electrical objectives and the raw data; and outputting the one or more operating parameter set points to the plurality of local power generating assets, wherein one or more operating parameter settings of the plurality of local power generating assets can be configured to be adjusted according to the one or more operating parameter set points to meet the one or more energy or electrical objectives.

In some aspects, the method can further include transforming the raw data into a structured protocol format via one or more protocol adapters.

In some aspects, the plurality of local power generating assets can include one or more of an electric vehicle station equipment (EVSE), a fixed energy storage system (FESs), and/or a local generation resource (LGR).

In some aspects, the LGR can include a solar, wind, and/or hydro power generating system.

In some aspects, the fixed energy storage system can include batteries, battery packs, capacitors, and/or energy storage cells.

In some aspects, the method can further include transforming the one or more operating parameter set points into one or more structured protocol formats, wherein the one or more structured protocol formats are configured to be interpreted by one or more devices in the plurality of local power generating assets.

In some aspects, the method can further include automatically adjusting the one or more operational parameter settings of a target member of the plurality of local power generating assets according to the one or more set points received by the target member.

In some aspects, the one or more operational parameter settings can be configured to control voltage, frequency, and/or current on the target member.

In some aspects, under the adjusted one or more operating parameter settings, the plurality of local power generating assets can be configured to transfer power between the plurality of local power generating assets and the power grid.

In some aspects, the electronic aggregation platform can be further in electrical communication with a local energy management system (LEMS), wherein generating and outputting the one or more operating parameter set points can be performed by a control system of the LEMS under control of the electronic aggregation platform.

In some aspects, the LEMS can be physically present at the local site.

In some aspects, the LEMS can be offsite in a remote server physically separated from the local site.

In some aspects, the electronic aggregation platform can be further in electrical communication with a plurality of other local energy management systems disposed at other different local sites, wherein each of the other local energy management systems can be configured to be electrically coupled to a corresponding plurality of local power generating assets having a predetermined power topology.

In some aspects, the method can further include determining one or more energy or electrical objectives for the local site at one or more future states.

In some aspects, the method can further include calculating one or more operating parameter set points for the local site at the one or more future states based at least in part on the one or more energy or electrical objectives for the local site at the one or more future states.

In some aspects, the method can further include predicting changes to the local site at the one or more future states based on the raw data at the present state and dynamic prediction models.

In some aspects, the changes to the local site at the one or more future states can include changes attributed to the plurality of local power generating assets.

In some aspects, the changes to the local site at the one or more future states can include system level changes at the local site.

The following description and the related drawings set forth in detail certain illustrative features of one or more implementations.

DESCRIPTION OF THE DRAWINGS

The appended figures depict certain aspects of the one or more implementations and are therefore not to be considered limiting of the scope of this disclosure.

Figure 1:
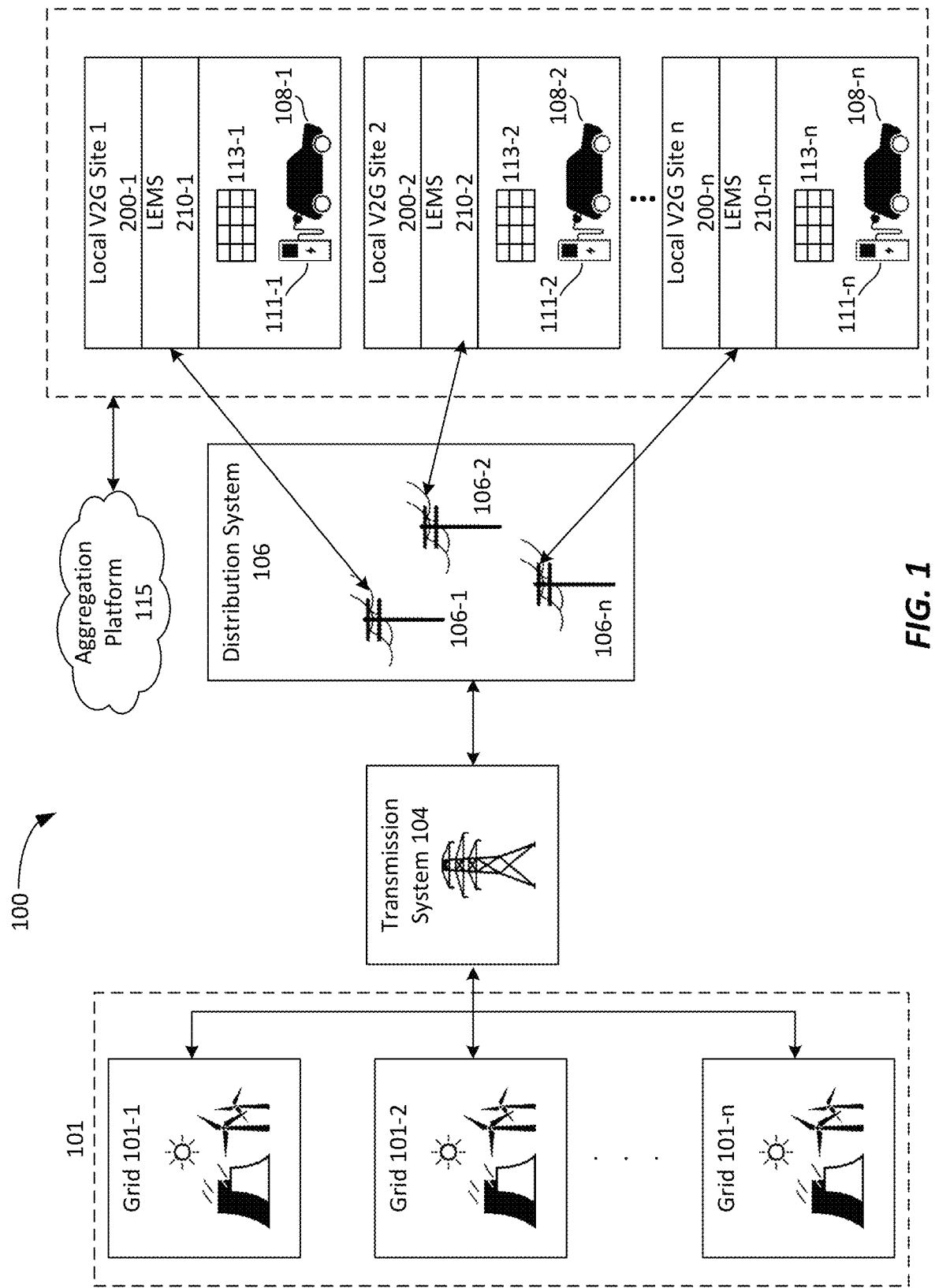
FIG. 1 depicts an example of a power distribution topology having one or more power producer grids electrically coupled to a remote distribution of multiple local mixed power generation sites.

To facilitate understanding, identical reference numerals have been used, where possible, to designate identical elements that are common to the drawings. It is contemplated that elements and features of one implementation may be beneficially incorporated in other implementations without further recitation.

DETAILED DESCRIPTION

FIG. 1 illustrates an example of a power distribution topology 100 having one or more power producer grids (101-1 to 101-n) electrically coupled to a remote distribution of multiple local mixed power generation sites (200-1, 200-2, . . . , 200-n) across various geographical locations via transmission system 104 and distribution system 106, according to an implementation. It is noted that the local mixed power generation sites (200-1, 200-2, . . . , 200-n) are not limited to the distribution topology 100 and may be implemented in other types of distribution topologies having configurations, which may or may not include a combination of transmission systems, distribution systems, grid systems, and/or microgrid systems having AC, DC, or mixed power systems. It is also noted that the local mixed power generation sites (200-1, 200-2, . . . , 200-n) are maintained, operated, and under the control of a grid service provider offering one or more grid services to a grid operator, distribution company, higher level aggregation server(s), generator, electric entity, and so on.

Terminology and numerical designations used herein will now be defined in reference to FIG. 1.

Numerical designations NNN-n such as 100-1, 200-1, and so on are used throughout this document where "NNN" represents a system level component and "-n" represents a local site component at a particular location "-n". In addition, system level references "NNN" are applicable to the local site components "-n" at each location having the same system level component "NNN", Each grid 101 generally refers to the electrical power system from generation to the electrical outlet. This includes generators, transmission and distribution lines, transformers, switchgear, and wiring at the "site" (e.g., a house, building, parking lot, and/or other parking location from the electric meter for that location through electrical panels to the electrical outlet). Sensors, computational logic, and communications may be located at one or multiple locations within the grid to monitor functions associated with the grid, and the vehicle's electrical system may satisfy one or multiple functions for the grid. Power producer grid 101 may be one or more utility-level power producers, such as power plants, for providing grid power. Though shown as a single entity, power producer may be representative of a plurality of power production entities, such as power plants of different type (e.g., coal, gas, nuclear, hydro, wind, solar, geothermal, and others). Power producer provides power to grid including grids of all scales.

Transmission system 104 generally refers to a transmission grid composed of a network of power stations, transmission lines, and substations, communicating power within a grid with DC and/or three-phase AC.

Distribution system 106 generally refers to the final stage of the electrical grid which distributes electricity to residential properties, commercial properties, industries, and other end users. Distribution may simultaneously deliver the electric power to the users on the grid 101 and reduce power to safe customer-usable levels once delivered.

Grid-integrated vehicles 108 generally refer to mobile machines for carrying passengers, cargo, or equipment. Grid-integrated vehicles have an "on-board" energy storage system (such as electrochemical, distillate petroleum products, hydrogen and/or other storage) and a grid connection system to recharge or supplement the on-board storage (e.g., a battery, capacitor or flywheel, electrolyzed hydrogen) with power from the grid 101. Grid-integrated vehicles may also be plugged into the grid 101 to provide power from the vehicle's on-board storage to the grid 101 (also referred to as a V2G electric vehicle).

Electric vehicle equipment (EVE) generally refers to equipment physically located in each grid-integrated vehicle 108 to enable communication and power flow. In an exemplary implementation, EVE receives EVSE attributes (described below) and controls power flow and grid services to and from the grid-integrated vehicle based on, for example, EVSE attributes, the state of the vehicles on-board storage, expected driving requirements and driver desires. EVE may include a vehicle link (VL), also referred to as a vehicle smart link (VSL), that provides an interface between EVSE and the grid-integrated vehicle's vehicle management system (VMS), which generally controls the electrical and electronic systems in the grid-integrated vehicle while not in use (e.g., while parked in a garage).

Electric vehicle station equipment (EVSE) generally refers to equipment for interfacing EVE with the grid 101. The EVSE may be located at, for example, a building or parking garage, near a street, or adjacent to a motor vehicle parking space. EVE within the grid-integrated vehicle 108 with on-board storage and power delivery and information connections may be connected to EVSE. EVSE stores EVSE attributes and can transmit the attributes to EVE of the grid-integrated vehicle or other devices.

Aggregation platform 115 refers one or more computer network servers having software, hardware, and management procedures that communicate with any energy load storage or energy producing device, such as but not limited to grid-integrated vehicles from EVE directly and/or via EVSE, issue requests to those vehicles for charging, discharging, and other grid functions, and offer grid services to a grid operator, distribution company, higher level aggregation server(s), generator, or other electric entity. The aggregation platform 115 may also receive reports on grid services and charging from EVE and/or EVSE. An aggregator is a business entity that manages the aggregation server 115. The aggregation platform 115 may manage (control) power flow to/from grid-integrated vehicles connected to the grid 101 to aggregate and sell power to grid operators (e.g., Megawatts of power (MWs)). The aggregation platform 115 may also manage information for other entities, including electric charging vendors, local distribution companies, and others. In yet another implementation, the aggregation platform 115 may include serverless-based systems. The serverless-based systems can be based on micro-services based architecture. The micro-services based architecture can include multiple processing applications and entities operating in a remote or cloud-based network. The remote or cloud-based network can include disparate computing systems.

Local mixed power generation sites (200-1 to 200-$n$) generally refer to a combination of one or more mixed power generation sources intelligently managed and controlled by an intelligent local energy management system designated at one or more remote sites. In operation, each local mixed power generation site (200-1 to 200-$n$) at each remote site is configured to receive and supply power to and from the grid 101 via one or more grid-integrated vehicle (108-1 to 108-$n$) and a local generation resource (113-1 to 113-$n$), where each of local mixed power generation site (200-1, to 200-$n$) is meant to be representative of one or more systems of like kind. The term "local" refers to being physically and/or logically tied to the site (200-1 to 200-$n$). A local power generation site (200-1 to 200-$n$) is also referred to as a microgrid, which has local power generation source(s) (not necessarily mixed), therefore the ability to be disconnected from the grid 101 and still sustaining the energy needs at the site, but can also be coupled with the grid 101 at one or more points to receive power from the grid 101 and/or discharge power to the grid 101.

EVE attributes generally refer to information describing the grid-integrated vehicle that may be transmitted to EVSE to which the vehicle is connected, the aggregation platform 115, or to another grid-integrated vehicle. These may include: (1) a unique grid-integrated vehicle ID, (2) allowed billing and other commercial relationships, (3) authorizations of this vehicle, such as IEEE 949 certification for anti-islanding, and (4) technical capabilities of the vehicle, including maximum power output, whether it can produce power independently of grid power ("emergency power mode"), and others.

EVSE attributes are information relating to EVSE such as its status, location, and other information. EVSE attributes generally refer to information related to EVSE that is transmitted to EVE of the grid-integrated vehicle. This may include: (1) characteristics of EVSE's physical capabilities; (2) legal and administrative allowances; (3) legal and administrative restrictions; (4) a unique EVSE ID; (5) allowed billing and other commercial relationships (which EVSE and grid-integrated vehicle participate in); (6) grid services that may be authorized (allowed) at this particular EVSE location, and/or others.

Electric charging vendor generally refers to a management entity that manages EVSE. In one implementation, an EVSE may not have any electric charging vendor. For example, an EVSE in a home garage, used to charge the homeowner's vehicle from the same electricity supply used by other appliances in the home. In other implementations, an electric charging vendor may have either real-time communication or delayed communication with EVSE, may provide real-time authorization for charging to a grid-integrated vehicle connected to the grid, and may require payment for charging.

Parking operator generally refers to a company or organization that controls a space where a vehicle may be parked, e.g., with one or more adjacent EVSE. The parking operator may charge for use of that space, require identification prior to parking, and/or may barter use of the space in exchange use of EVSE.

Grid operators may include, for example: (1) a distribution system operator (DSO); (2) a transmission system operator (TSO) or an independent system operator (ISO); (3) a generator; (4) an independent power producer (IPP); and/or (5) a renewable energy operator.

Grid services generally refer to services provided between the grid-integrated vehicle and the grid 101, with power flowing through the EVSE. Grid services may include: (1) local building services, such as emergency power; (2) distribution system services such as: (i) providing reactive power, (ii) drawing off-peak consumption, (iii) balancing load on a three phase system, (iv) providing demand response, (v) providing distribution support (e.g., by deferring consumption or releasing energy when the distribution system is reaching a limit, or by using condition monitoring such as transformer temperature to reduce power through that transformer); and (3) transmission and generation system support such as: (i) providing frequency regulation, (ii) providing inter-hour adjustments, (iii) providing spinning reserves; and/or (4) renewable energy support such as (i) providing wind balancing, (ii) providing ramp rate reduction, (iii) providing a shift of energy from the solar peak to the load peak, (iv) absorbing wind or solar power when it exceeds load, among many others. For example, grid services may include charging at off-peak times, regulating the quality of grid power, producing power quickly and sufficiently to prevent grid failures or blackouts, and leveling generation from fluctuating renewable energy sources such as wind and solar sources.

Grid location generally refers to the electrical system location where EVSE is connected. This may be a hierarchical location (e.g., electrical position) in the electric system, and may not correspond to a physical location. In an exemplary implementation of the disclosure, grid location may be defined based on one or more of: (1) the building circuit to which EVSE 111 is connected and fused; (2) the service drop and meter to which EVSE is connected; (3) the distribution transformer to which EVSE is connected; (4) EVSE's distribution feeder; (4) EVSE's substation; (5) EVSE's transmission node; (6) EVSE's local distribution company; (7) EVSE's transmission system operator; (8) EVSE's subregion; and (9) EVSE's region, ISO or TSO. Due to distribution circuit switching (e.g., reconfiguration) intermediate positions in the hierarchical structure may dynamically change such that EVSE's grid location, for example, may dynamically move from one distribution feeder to another as distribution switches are opened and closed, even though the physical location of the EVSE does not change.

Local Energy Management System (LEMS)

Aspects of the present disclosure provide apparatuses, methods, processing systems, and computer readable mediums of an intelligent Local Energy Management System (LEMS) 210 for managing, optimizing, and controlling power to and from the grid 101 via combining and mixing local power generation sites having energy storage and generation systems at each local site (Site-1 ... Site n). Each local site (Site 1 to Site n) may be equipped its own LEMS (210-1 to 210-$n$) for executing logic for managing, controlling, and performing energy management to and from the grid as well as delivering on grid services. In order to achieve that, the LEMS 210 is configured to receive and analyze inputs from available resources at the local site including, for example, local generation, stationary storage, or power supplied by electric vehicles when plugged into EVSEs at an EVSE charging station. These EVSEs can support unidirectional, bidirectional, AC or DC via power converters. The LEMS 210 may also receive sensing inputs from all available resources within each local site and optionally tap into an energy meter for monitoring the different sub-components at any given point in time. In addition, the LEMS 210 may receive inputs and control signals from the aggregation platform as well as transmitting data back to it in order to control local assets for meeting power demands to and from the grid 101. Furthermore, the LEMS 210 may receive multiple input data from local assets, subcomponents, and external systems in order to meet objectives of the site 200 for delivering grid services to and from the grid 101. Moreover, the LEMS 210 may determine and generate operational set points based upon the input data from the local assets, conveying these set points across the different subsystems of the local assets in order to meet the objective of the site 200. Implementations of the intelligent Local Energy Management System LEMS 210 at each local site (Site 1 to Site n) are provided in the following sections.

Figure 2A:
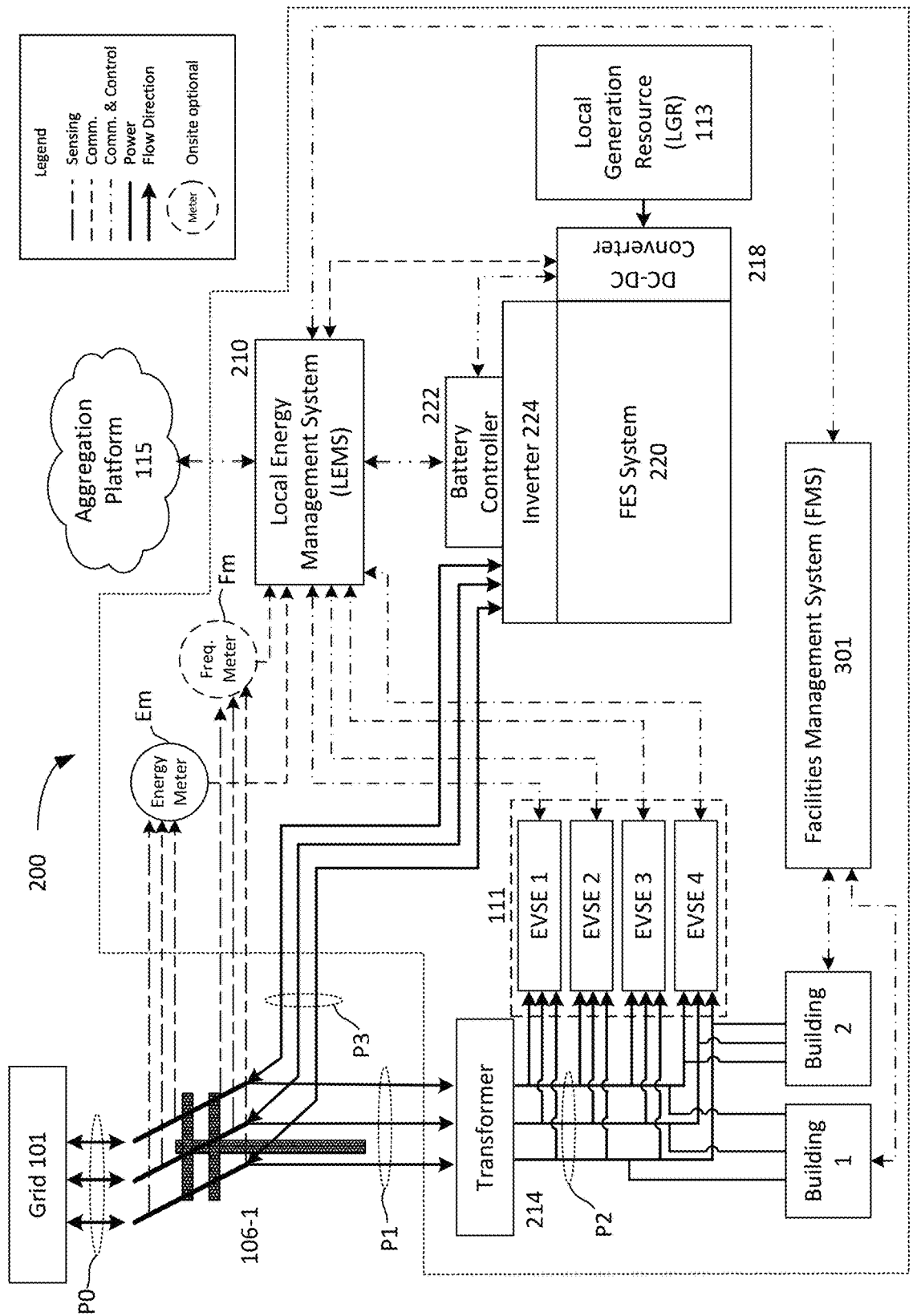
FIG. 2A depicts an example power topology at one local mixed power generation site having a mixture of local power generating assets.
Figure 2B:
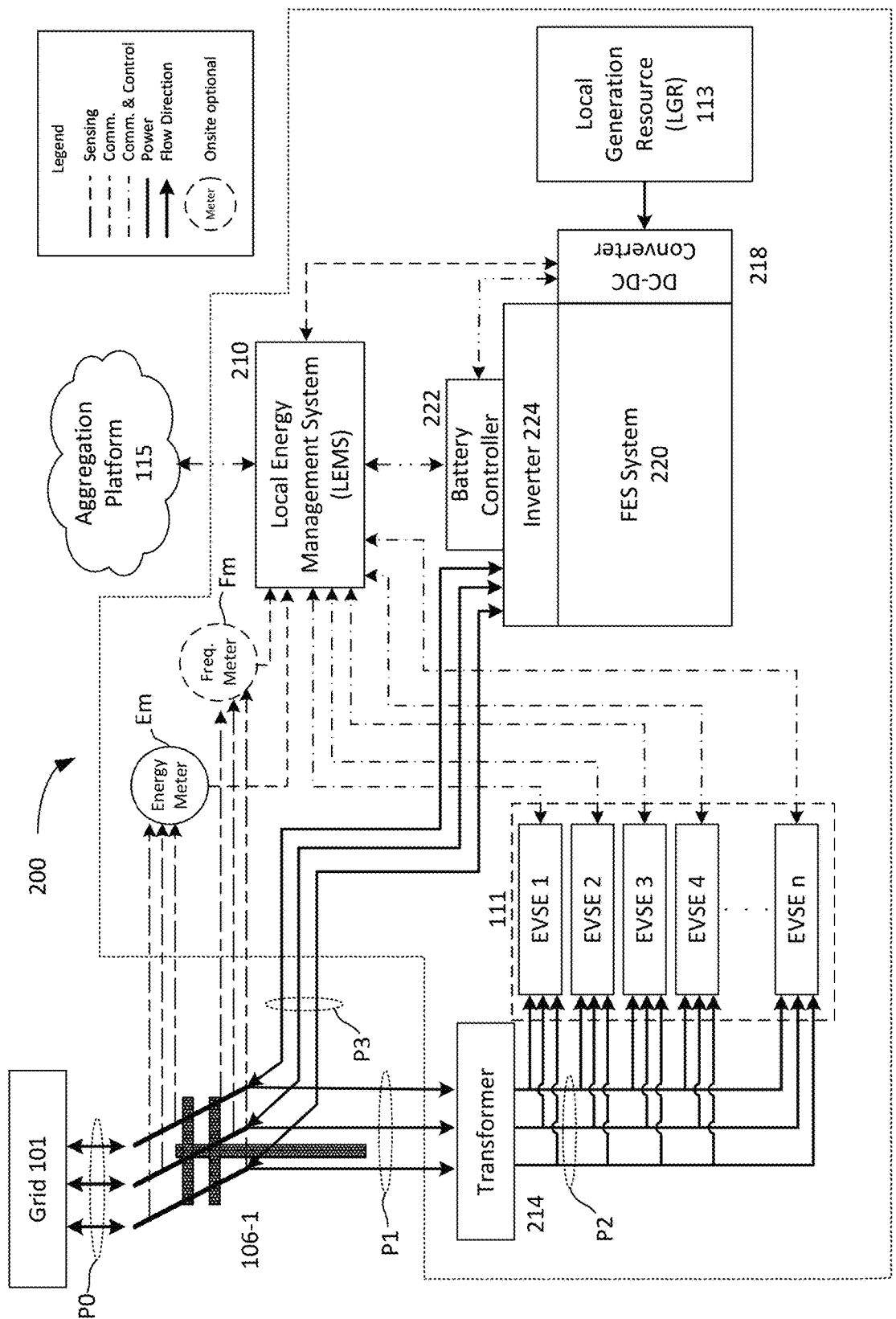
FIG. 2B depicts example of a power topology at one of the local mixed power generation site having a mixture of local power generating assets.

FIGS. 2A-2B illustrate examples of power topology at one of the local mixed power generation site 200 having a mixture of local power generating assets ("local assets"). The illustrated power topology also includes internal subsystems, hardware components, and metering devices for communicating condition statuses, monitoring electrical conditions, transmitting control signals, and delivering and receiving power to and from the grid 101 over power lines P0. In the foregoing disclosure, the power topology examples depicted in FIGS. 2A-2B at the local mixed power generation site 200 provide a general representation of a system level configuration applicable to each power generation site (200-1 in FIG. 2A and 200-1 to 200-$n$ in FIG. 2B). A legend is depicted in the upper right hand corner of FIGS. 2A-2B illustrating line patterns, arrows, and other reference objects which indicate sensing paths, communication lines, power lines, control paths, and flow direction within the local mixed power generation site 200. Examples of network communication lines and control paths may be implemented via wireless such as wireless adapters and antennas or wired connections such as but not limited to network cabling, fiber optical lines, twisted pair or coaxial cable. In addition, other network equipment (not shown) are provided in the system for handling the communication, interaction, and mediation of data transmission between devices over a computer network, including but not limited to network controllers, switches, hubs, routers, access points, and repeaters. Examples of power lines (P1, P2, P3) at site 200 may be implemented over AC and or DC power lines with varying degrees of voltage lines such as low-voltage lines, medium voltage lines, high-voltage lines, and extremely high-voltage lines.

A non-limiting example of how a local energy management system (LEMS) 210 works in a local mixed power generation site 200 will be described with reference to FIG. 2A. In the illustrated example, the LEMS 210 is physically onsite. The LEMS 210 is in communication with and under control by the aggregation platform 115, which intelligently manages and controls a multitude of grid services over the local mixed power generation sites 200. Multiple local power generating assets at the local mixed power generation site 200 are in communication with and under control by the LEMS 210. In the illustrated example, one group of local power generating assets includes four EVSEs ($EVSE_{1...4}$) located at a public EVSE charging station 111. The EVSEs 1-4 leverage on-board batteries from electric vehicles (EV) 108 (see FIG. 1) plugged into the EVSEs 1-4. The EVSEs 1-4 can communicate power to and from the grid 101 over power lines (P0, P1, and P2). Under control of the LEMS 210, the EVSEs 1-4 can charge the batteries from a plugged-in electrical vehicle by communicating power from the grid 101 over the power lines P0, P1, and P2. Under control of the LEMS 210, one or more of the EVSEs 1-4 can also discharge the batteries from a plugged-in electrical vehicle by communicating power to the grid 101 over the power lines P0, P1, and P2. Alternatively, the power discharged from the EVs can be provided to Building 1 and/or Building 2, which can be managed by Facilities Management System (FMS) 301. The LEMS 210 can query the FMS system 301 to determine the amount of power provided to Building 1 and/or Building 2 by the EVs.

In the illustrated example, the LEMS 210 can query the EVSEs at the local site 200 and/or the FMS system 301 and determine the following: EVSE1 is bidirectional with a V2G electric vehicle (EV) plugged in. In one non-limiting example, the combination of the plugged-in EV and EVSE1 has a power capacity of −40 kW charge and 40 kW discharge. The power capacity can limit the maximum capacity of the EV and/or the EVSE. The EV plugged in at EVSE1 is currently charging at −20 kW, and the charging is controllable. EVSE2 is bidirectional with a V2G EV plugged in. Charging of the EV plugged in at EVSE2 is not controllable due to the mobility needs of the user. The EV plugged in at EVSE2 is currently charging at −60 kW. In other words, EVSE2 is acting as a load with −60 kW power draw. EVSE3 is unidirectional with an EV plugged in. Discharge is not applicable because EVSE3 is unidirectional. The combination of the plugged-in EV and EVSE3 has a power capacity of −240 kW charge. The EV plugged in at EVSE3 is currently charging at −120 kW and the charging is controllable. EVSE4 is available without an EV plugged in.

In the illustrated example of FIG. 2A, another local power generating asset includes a unidirectional local generation resource (LGR) 113 for producing a DC power that is regulated via a DC-DC converter 218 and then subsequently captured and stored in a fixed energy storage (FES) system 220. The FES system 220 provides the site 200 with a local power source for delivering and receiving bidirectional power to and from the grid 101 over power lines (P0, P3) via an inverter 224 and distribution system 106. The FES system 220 includes batteries electrically connected to an FES control system. In the illustrated example, the LEMS 210 queries the LGR 113 and determines that the LGR 113 is generating 20 kW, which is feeding to the FES system 220 and in this example is not being used to power the local site. The LEMS 210 can query the FES system 220 and determines that the FES system 220 is at 98% State of Charge (SOC). The SOC allows the LEMS 220 to decide the dispatch and prioritization of this asset (that is, the FES system 220) to other system components.

Other sub-components operating for supporting the power generation at the site 200 include a transformer 214, an inverter 224, a battery controller 222, a DC-to-DC power converter 218, and sensing meters including Energy Meter Em, and Frequency Meter Fm. In the illustrated example, the LEMS 210 queries the other sub-components and determines that the inverter 224 has a power capacity of 30 kW discharge and is idle. The LEMS 210 further determines that other loads at the site 200 is drawing power from the grid 101 at −60 kW, which is not controllable.

Based on all the queries, the LEMS 210 can compute the flexibility capacity of the site 200 to be −210 kW charge (up) and 170 kW discharge (down). Flexibility capacities can provide a range of set points of the entire local mixed power generation site 200. The LEMS 210 can determine that the energy meter Em is showing a reading of −260 kW import drawn from the grid. This reading is consistent with a sum of the capacities described above, that is, −20 kW at EVSE1, −60 kW at EVSE2, −120 kW at EVSE3, and −60 kW other loads.

The LEMS 210 can receive an objective of flexibility of −180 kW charge (up) from the aggregator 115, in other words, to receive −180 kW more from the grid. In order to meet the objective, the LEMS 210 can dynamically adjust operating parameters of the components at the site 200 based on the queries (that is, sensed data). For example, the LEMS 210 can send the following command to EVSE3: from −120 kW to −40 kW. After the adjustments in the operating parameters, the meter then reflects a new reading of −180 kW import (−260+−(−80)), which is −80 kW less than the original −260 kW import from the grid and therefore the flexibility objective of −180 kW is met. Alternatively, the LEMS 210 can send different commands to adjust the operating parameters differently to meet the objective, for example, 30 kW discharge to the battery controller 222; and −70 kW charge to EVSE3. When there are different ways that the LEMS 210 can adjust the operating parameters to meet the objective, prioritization is based on mobility need, load shedding, and/or efficiency and response time. In some implementations, mobility need can have the highest priority, followed by load shedding and then efficiency and response time. Other factors and/or orders for prioritization are also possible.

Referring again to FIG. 2B, each local mixed power generation site 200-1 to 200-n may include 1) a local energy management system (LEMS) 210 in communication with and under control by an aggregation platform 115 which intelligently manages and controls a multitude of grid services over one or more local mixed power generation sites (200-1 to 200-n); and 2) multiple local power generating assets in communication with and under control by the LEMS 210. In one aspect, the LEMS 210 can relay information to the aggregation platform 115 for forecasting, optimizing, dispatching, monitoring, and bidding grid services. In another aspect, the LEMS 210 can leverage storage from a combination of local power generating assets, which can be co-optimized locally at the local site. These mixture of local power generating assets at each site 200 may include: 1) a first local power generating asset comprised of multiple EVSEs ($EVSE_{1 \ldots n}$) located at a public EVSE charging station 111 for leveraging on-board storage (e.g., batteries) from electric vehicles 108 plugged into the EVSEs, communicating power to and from the grid 101 over power lines (P0, P1, and P2); and 2) a second local power generating asset comprised of a unidirectional local generation resource (LGR) 113 for producing a DC power that is regulated via a DC-DC converter 218 and then subsequently captured and stored in a fixed energy storage (FES) system 220. The FES system 220 provides the site 200-1 a secondary local power source for delivering and receiving bidirectional power to and from the grid 101 over power lines (P0, P3) via an inverter 224 and distribution system 106-1. In some implementations, the FES system 220 may include a plurality of energy storage devices (e.g., batteries, battery packs, capacitors, and other types of energy storage cells) all electrically connected to an FES control system. In this way, collocated energy storage devices may be added modularly to an FES system without the need for redundant control equipment. In one aspect, the LEMS 210 may be physically onsite. In another aspect, the LEMS 210 may be offsite, residing in a remote or cloud server management system physically separated from the local site. Other sub-components operating for supporting the power generation at the site 200 include one or more transformers 214, one or more inverters 224, battery controller 222, power converter 218, and sensing meters (Em, Fm).

Figures 3A, 3B, 3C:
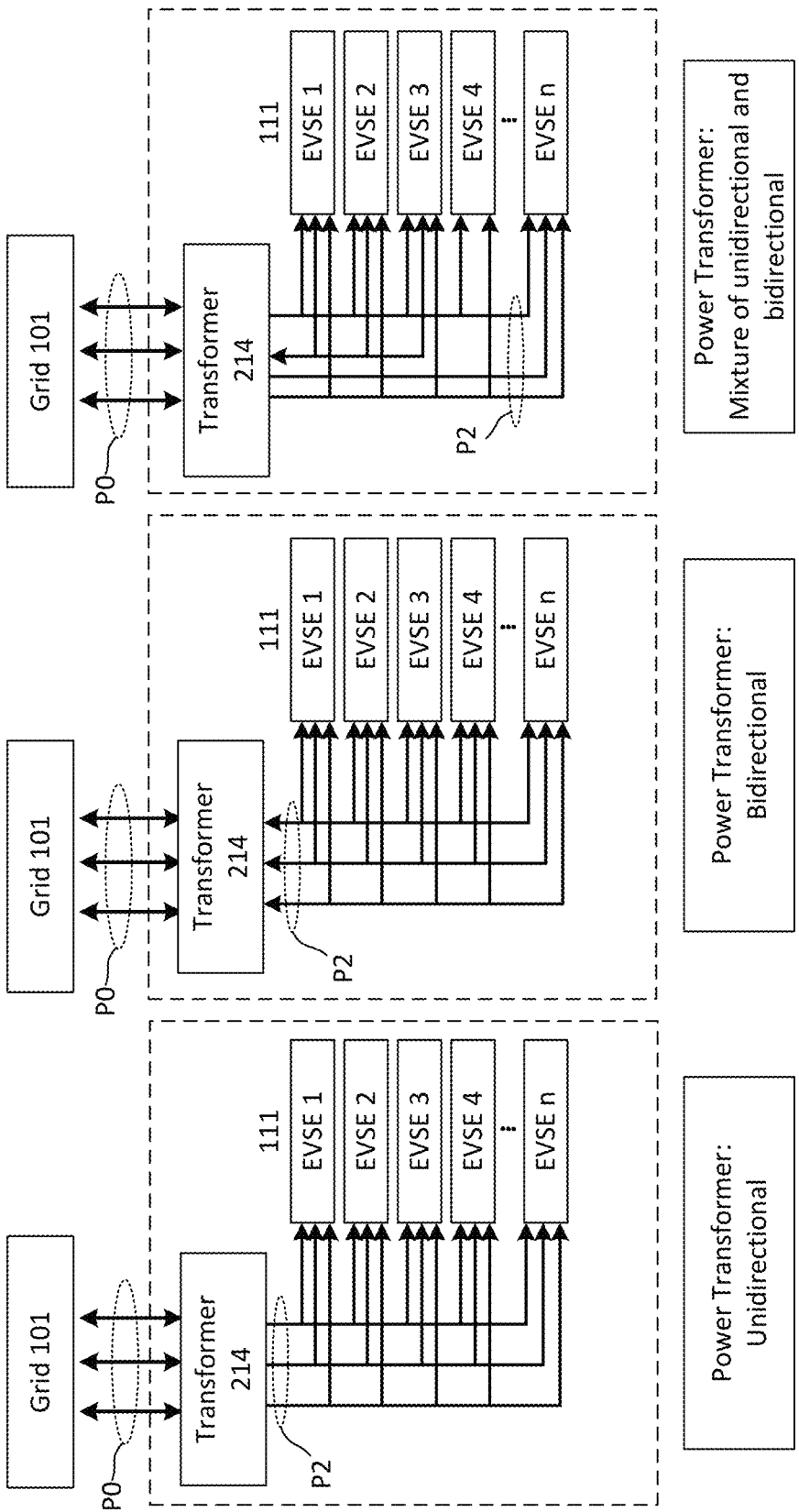
FIG. 3A-FIG. 3C depict a view of local power generating asset comprising multiple EVSEs at an EVSE charging station.

FIG. 3A-FIG. 3C illustrate a view of the first local asset comprised of multiple $EVSE_{1\ldots n}$, disposed at a EVSE charging station 111 for communicating power to and from the grid 101 over grid power lines (P0-P2), according to an implementation. The first local asset may have various types of charging infrastructures for delivering and receiving power to and from the grid 101. For example, the charging infrastructure may include EVSEs having unidirectional (one-way) EV chargers as shown in FIG. 3A, bidirectional (two-way) EV chargers as shown in FIG. 3B, or a mixture of unidirectional and bidirectional EV chargers as shown in FIG. 3C. When an electric vehicle EV 108 is plugged into an EVSE equipped with unidirectional EV chargers, electricity flows in one direction from the grid 101 to the electric vehicle EV 108 via the transformer 214 for charging the battery in the electric vehicle 108. For EVSEs equipped with bidirectional EV chargers, electricity flows in a two-way direction between the grid 101 and the electric vehicle EV 108 for either charging the battery or discharging the power from the battery back to the grid 101 through the transformer 214. In FIG. 3C, $EVSE_{1\ldots n}$ at EVSE charging station 111 includes a combination of charging infrastructures supporting both unidirectional and bidirectional EV chargers. For example, a first set of the EVSEs ($EVSE_{1\ldots 3}$) at charging station 111 can have bidirectional chargers allowing EV connected vehicles both charging and discharging capabilities, while a second set of EVSEs ($EVSE_{4\ldots n}$) have unidirectional chargers, allowing EV vehicles only charging capabilities when plugged into the unidirectional charging station.

In operation, the LEMS 210 can query the EVSEs at the local site 200 and can dynamically adjust operating parameters based on the charging infrastructure and electric vehicles present at the local site. For example, the LEMS 210 can query the EVSEs and determine whether the $EVSE_{1\ldots n}$ under unidirectional power flow (P1) can be curtailed while other EVSEs cannot be curtailed where feed power is not communicated locally or to the grid 101. The LEMS 210 may also treat some EVSE's having bidirectional EV charging capabilities to operate in a unidirectional mode based on the type of electric vehicle EV 108 that is connected to it. This includes some electric vehicles 108 that do not have the onboard equipment to support bidirectional power flow and therefore is treated as a unidirectional asset by the LEMS 210 from the EVSE's perspective. In another instance, the LEMS 210 has determined EVSE set points for controlling the power flow of certain EVSE's with bidirectional EV chargers, causing them to operate either in a bidirectional power flow mode or a unidirectional power flow mode for the purpose of meeting power supply and load demands of the grid 101.

Figure 4:
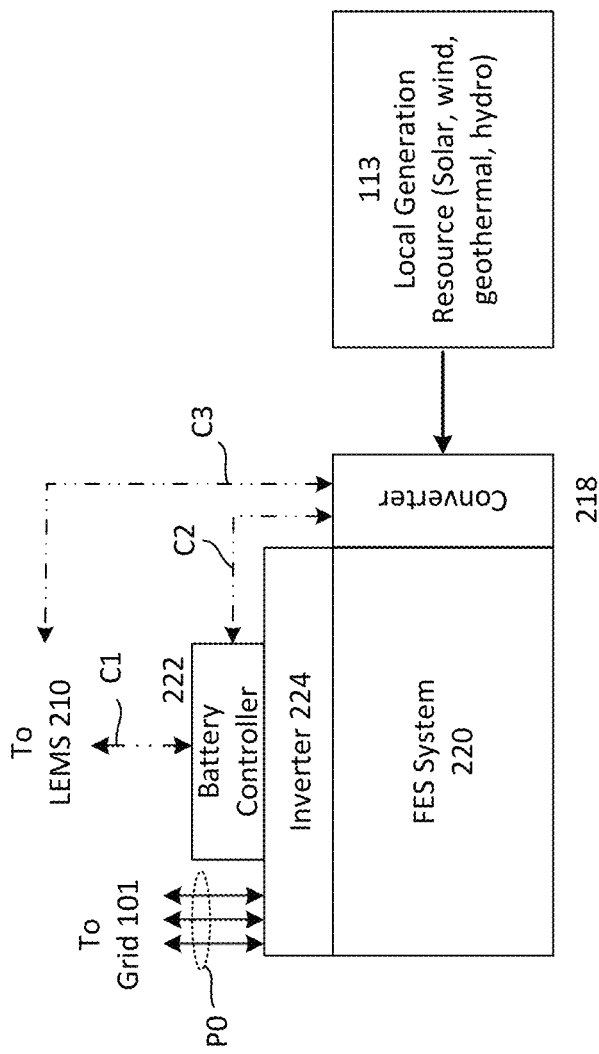
FIG. 4 depicts a view of the second local power generating asset comprising a local generation resource and FES.

FIG. 4 illustrates a view of another local power generating asset comprising the local generation resource LGR 113 and FES 220, according to an implementation. The local generation resource LGR 113 provides the local site 200 with another local power source, generating and supplying unidirectional power which is captured and stored in the FES system 220. Examples local generation resource LGR 113 includes but is not limited to solar, wind, geothermal and hydro generation power sources. The FES system 220 may include all types of energy storage devices such as batteries, battery packs, capacitors, and other types of energy storage cells, all electrically connected to an internal FES control system. The site 200 may include other components for transforming and regulating power such as power converter 218, a battery controller 222 and inverter 224 generated by the LGR 113. For example, the battery controller 222 may receive commands via communication and control line C1 from the LEMS 210 to control charging and discharging modes of the stationary battery 220 while the inverter 224 is configured to convert and regulate current flow (AC/DC or DC/AC) to and from the stationary batteries of the FES system 220. In one implementation, the battery controller 222 may receive commands from the LEMS 210, causing the stationary battery to receive power from the grid 101 via inverter 224 and to therefore act as a load in order to perform demand-based grid services, or to provide power to the grid 101 over power lines P0, and therefore to perform supply-based grid services. In another implementation, the local generation resource 113 is coupled to FES system 220 via a power converter 218, receiving signals from the battery controller 222 or the LEMS 210 via communication and control lines (C2, C3) and thereby converting unregulated power produced by the LGR 113 to regulated DC power which feeds and directly charges one or more stationary batteries of the FES system 220.

Figure 5:
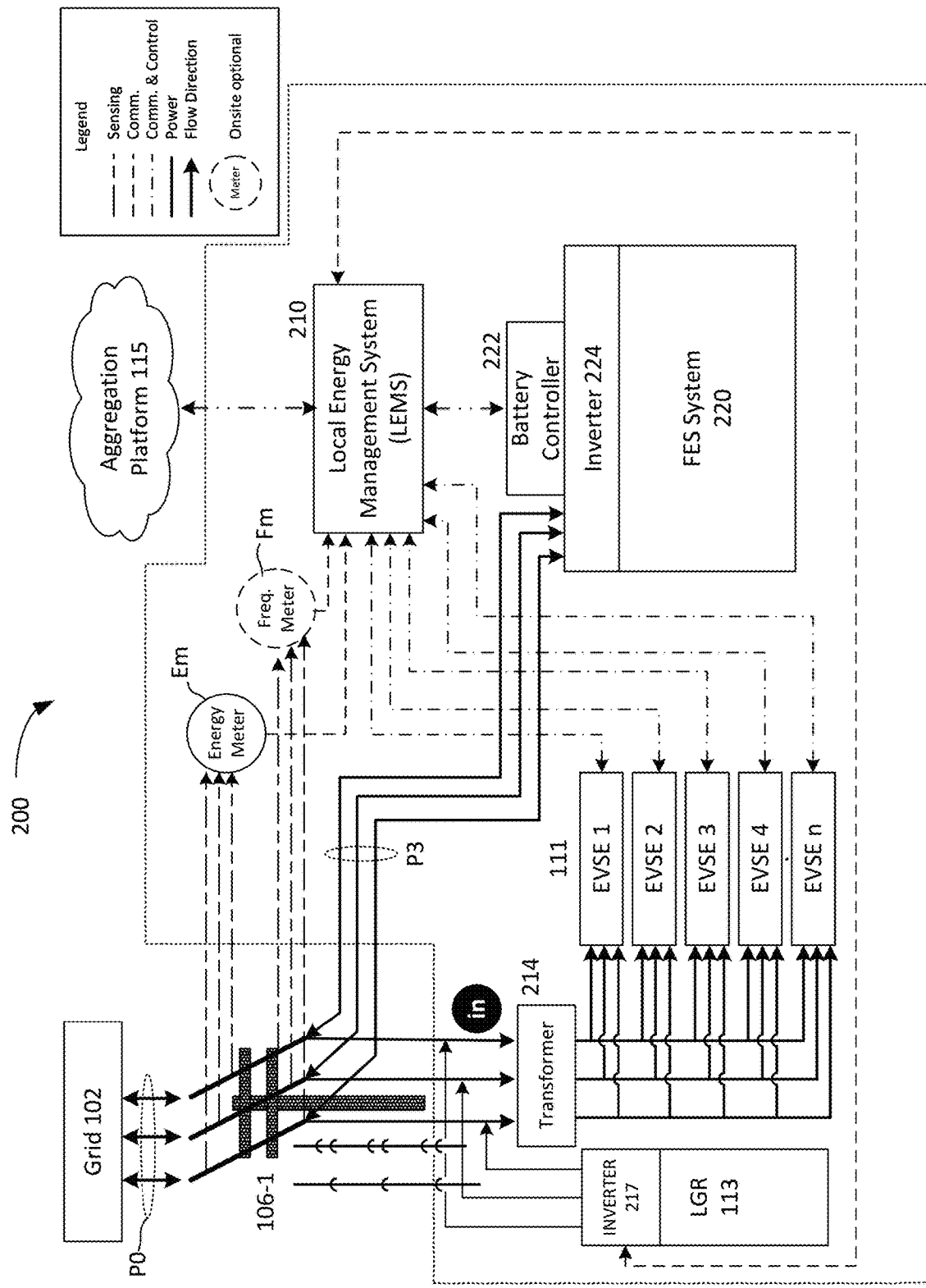
FIG. 5 depicts an example power topology at the local mixed power generation site.

FIG. 5 illustrates a power topology at one of the local mixed power generation site 200 for delivering and receiving power to and from the grid 101. The power topology example in FIG. 5 can incorporate any of the features of other power topology example disclosed herein, with the differences described with reference to FIG. 5. In this power topology, the LGR 113 is applied and electrically coupled to an input side (in) of the transformer 214 via a DC-AC inverter 217, supplying a unidirectional AC power source to both the transformer 214 and the stationary battery 220 (via inverter 224). This unidirectional power supplied LGR 113 is controlled by LEMS 210 to mediate power supplied by the LGR 113 to the site 200 depending on determined set points based up power supply and demand requirements of the grid 101. Implementation of this power topology may be applied to and integrated into existing local power generating sites. Features of the different power topology examples disclosed herein can be incorporated into another power topology example.

Figure 6:
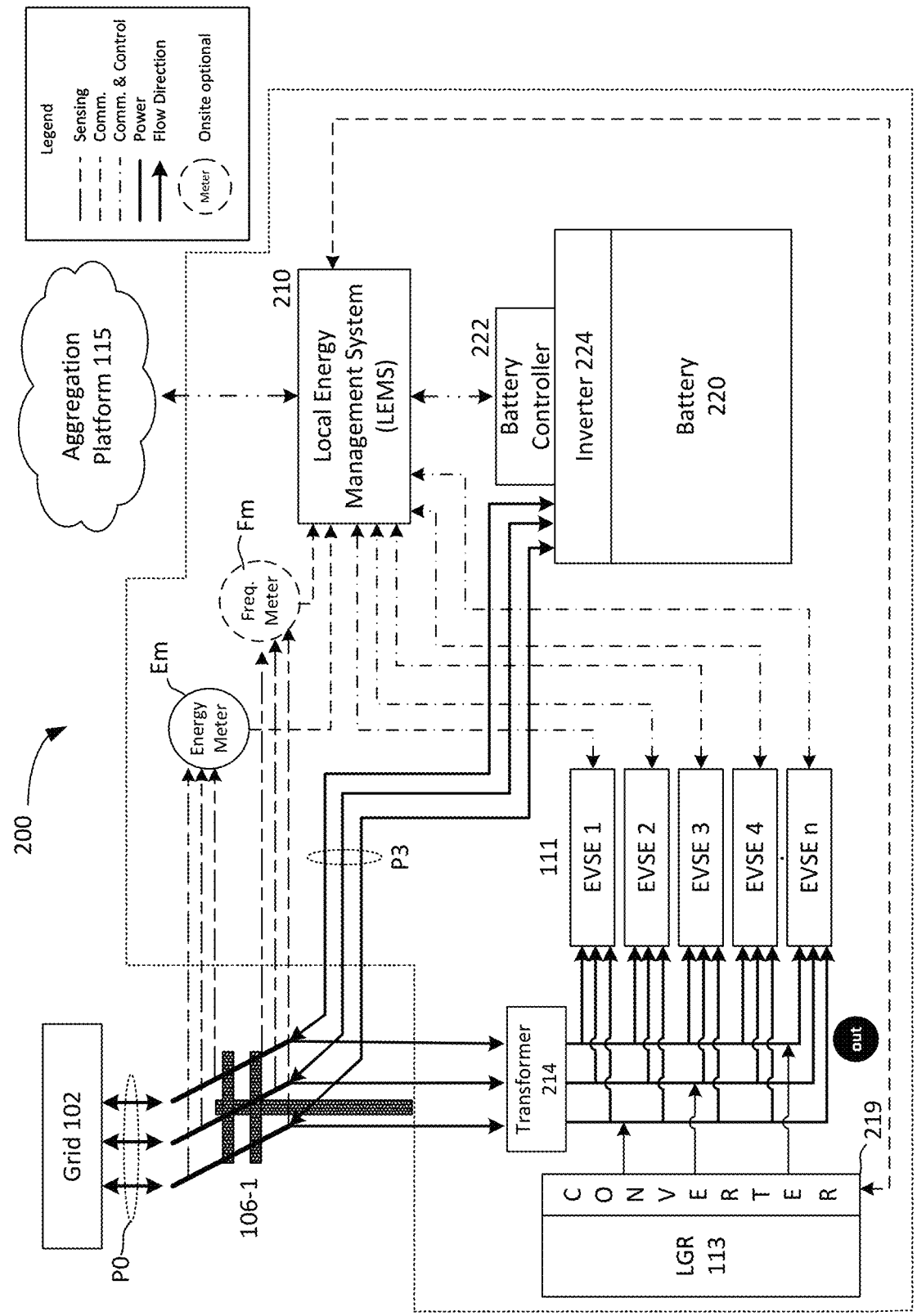
FIG. 6 depicts an example power topology at the local mixed power generation site.

FIG. 6 illustrates a power topology at the local mixed power generation site 200 for delivering and receiving power to and from the grid 101. The power topology example in FIG. 6 can incorporate any of the features of other power topology example disclosed herein, with the differences described with reference to FIG. 6. In this implementation, the LGR 113 and power converter 219 can be applied at an output side (out) of the transformer 214 having direct connections to the EVSEs, supplying a unidirectional DC power source directly to an output side of the transformer 214 (or input side of the EVSEs via power converter 219. In other implementations, the local mixed power generation site 200 may be configured to support multiple transformers and/or inverters operating within the local site. In all power topologies described herein, the LEMS 210 is configured to receive input parameters from all local assets, including for example, the transformers, LGR, inverter, battery, etc., via a communication network describing the topology and electrical connections of these local assets in order to effectively manage, control and optimize each local asset according to set points and goals demanded from the site 200. In one instance, for example, the LEMS 210 can generate a dynamic query mechanism for transmitting a request signal to each local asset in the site 200, requesting setup, layout and/or electrical connection configurations for each local asset in order to determine and have awareness of the current configuration and available assets in the power topology of the site 200. The dynamic query mechanism may be generated by a combination of software, firmware, and hardware constituents contained within the system architecture of the LEMS 210 as described in the following sections.

Figure 7:
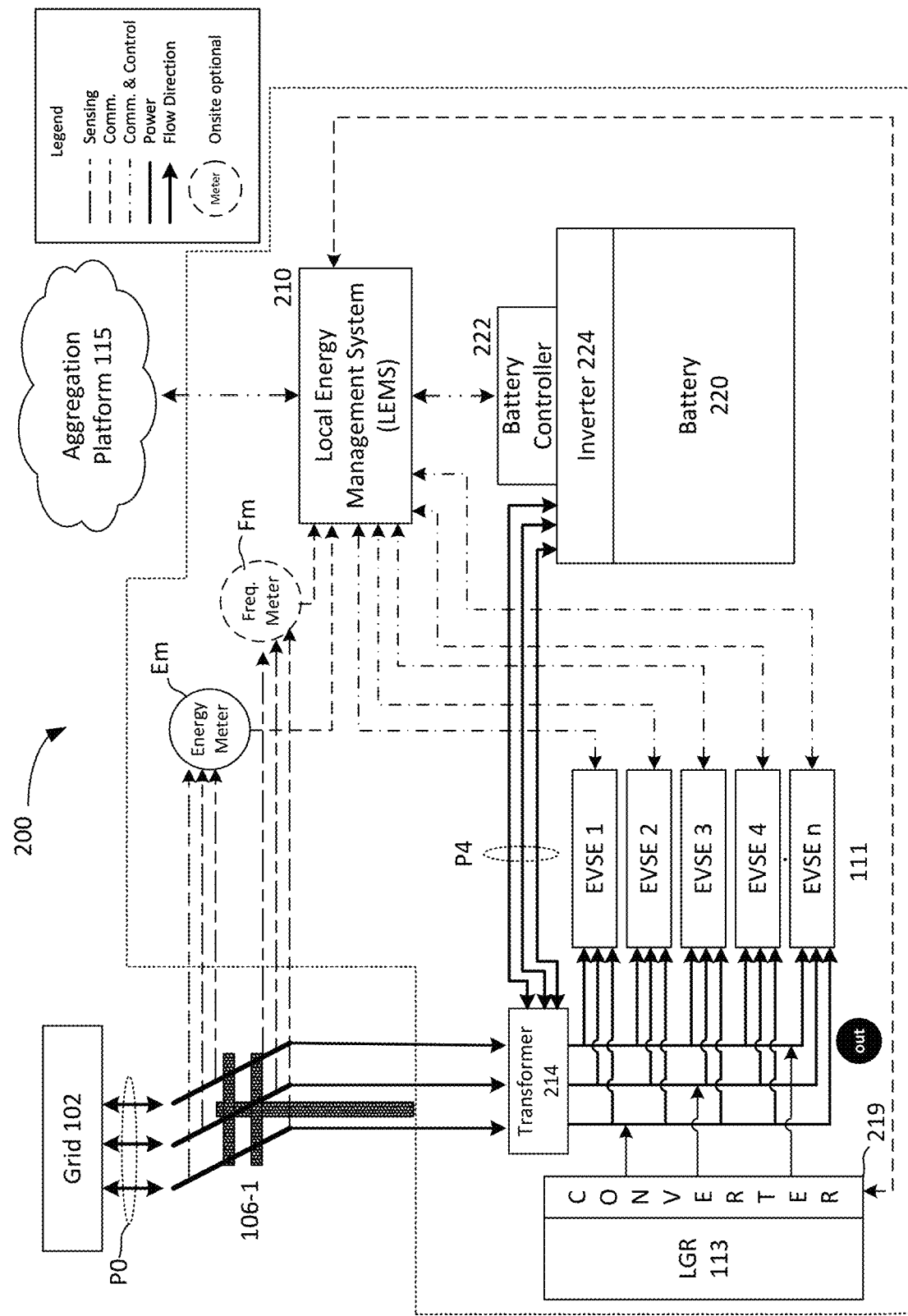
FIG. 7 depicts an example power topology at the local mixed power generation site.

FIG. 7 illustrates a power topology at the local mixed power generation site 200 for delivering and receiving power to and from the grid 101. The power topology example in FIG. 7 can incorporate any of the features of other power topology example disclosed herein, with the differences described with reference to FIG. 7. In the previous implementations, bidirectional power is configured flow to and from the grid 101 over power lines (P0, P3) via the inverter 224 and distribution system 106-1. In contrast to the prior implementations, power lines (P4) may be disposed directly between the transformer 214 and the inverter 224, allowing bidirectional power to flow between the transformer 214 and the battery 220, thereby indirectly bypassing the distribution system 106-1. Advantageously, this power topology is configured in a manner by which the inverter 224 voltage does not have to match the grid voltage having a much high voltage rating (e.g., 12 KVAC), which would also require larger inverter voltage ratings to match the grid voltage ratings. In this implementation, however, a much lower inverter voltage rating (e.g., 480 VAC) can be used when connected directly to the transformer 214 instead of the grid 101, allowing for lower inverters ratings and thereby reducing costs in equipment capital expensive.

Figure 8:
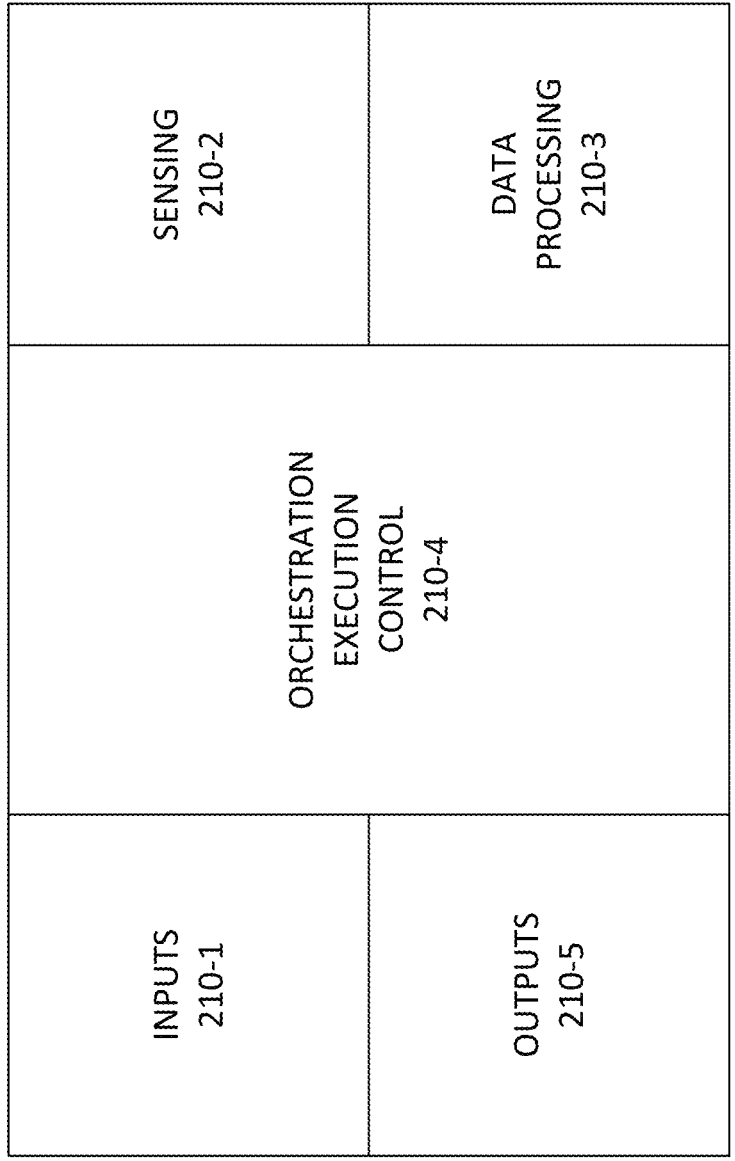
FIG. 8 depicts a block diagram of the local energy management system (LEMS).

FIG. 8 illustrates a block diagram of the local energy management system (LEMS) 210 operating at each local mixed power generation site 200, according to an implementation. The LEMS 210 at each local site (sites 1 ... n) is composed of several sub-systems for intelligently managing, optimizing, and controlling local assets within the local mixed power generation site 200 based upon a power topology, site configuration, available assets at the local site, supply and load demands conditions between the local site and the grid, operating conditions of the mixed local assets (e.g., EVSEs and LGR 113) at any given time, and external requests between the aggregation platform 115 and the local mixed power generation site 200. In one aspect, the LEMS 210 may include 1) an inputs sub-block 210-1 having multiple input connections from internal and external sources; 2) a sensing sub-block 210-2 having real-time monitoring detectors for sensing current flow and voltages at various internal power generating sources (e.g., EVSEs and LGR); 3) a data processing sub-block 210-3 having protocol adapters for analyzing and processing data received by the inputs and sensing blocks (210-1, 210-2); 4) an execution and control sub-block 210-4 for executing commands and generating one or more signals to control and optimize local assets (e.g., EVSEs and LGR); and 5) an output sub-block 210-5 having multiple output ports for providing a communication link and control path between the LEMS 210, the internal power generating sources (e.g., EVSEs and LGR), and aggregation platform 115. In operation, the LEMS 210 is configured to receive and transmit data to and from local power assets (e.g., EVSEs and LGR) including commands from the aggregation platform 115 at inputs sub-block 210-1. In addition, the LEMS 210 can receive and analyze data from the metering sensors (Em, Fm) via the sensing sub-block 210-2. Based upon the data inputs received from the local power assets and metering sensors (Em, Fm), the LEMS 210 can process the received data via the data processing sub-block 210-3, generate and execute control signals via the control sub-block 210-4, and then transmit the control signals to adjacent power components via the output sub-block 210-5, thereby optimizing and leveraging the local power storage generated by the mixed local assets (EVSEs and LGR 113) in order to provide grid services to and from the grid 101. Advantageously, the LEMS 210 provides an intelligent local power management system at each local site moderating grid based services to and from the grid 101 by effectively co-optimizing the local assets and leveraging the local power storage generated by these assets.

Figure 9:
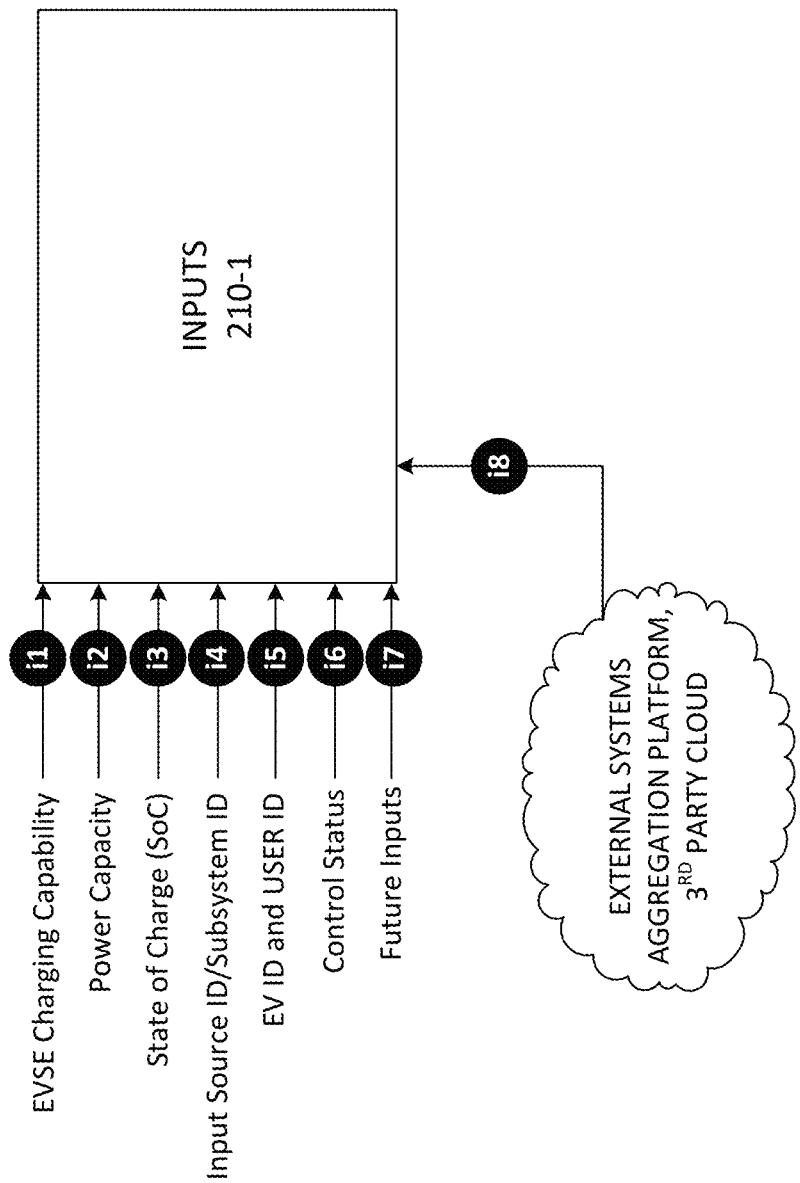
FIG. 9 depicts an inputs sub-block of the local energy management system (LEMS).

FIG. 9 illustrates the inputs sub-block 210-1 of the local energy management system (LEMS) 210, according to an implementation. The inputs sub-block 210-1 may comprise an input interface unit having multiple data communication links and channels for receiving input signals conveying input data from local assets and external systems available at the site level. The input interface unit in the inputs sub-block 210-1 may be configured to receive analog signals, receive digital signals, receive and convert analog signals into digital signals, and vice-versa. The input data received at the input interface unit can be raw data, which is pre-harmonized. The input interface unit can convert the raw or input data (i1 ... i8) into an appropriate format and structured to be interpreted by the LEMS 210. Entity sources generating input data (i1 ... i8) to the LEMS 210 include, for example, EVSEs, LGR 113, metering devices, etc., while other sources of input data are provided by external systems such as the aggregation platform 115, a $3^{rd}$ party data service provider, grid utility operators, Distribution System Operators (DSO), building management systems, or other grid operating sources coupled to the site 200. Types of input data received at the inputs sub-block 210-1 may include but are not limited to local profile data, status data, capacity data, controllability data, error data, informational data, and measurement data of all local assets and external systems connected to the local site 200. The data format of the input data may include data of different types of communication protocols such as but not limited to TCP/IP, 802.11, MOD-BUS, IEC, CAN-BUS, USB, and so on based upon the input device and system sending the data to the LEMS 210. Table 1.0 below provides a list of some exemplary input data received at inputs sub-block 210-1.

TABLE 1.0

Input data received at Inputs Sub-block 210-1

| Input Data | Description | Systems, Local Assets, sub-components, devices, subsystems, or External System |
|---|---|---|
| EVSE Charging Capability, (i1) | Data and status information about the EVSEs charging capabilities: unidirectional or bidirectional. | $EVSE_{1...n}$ |
| Power Capacity, (i2) | Power capacity data of different assets and subsystems, having an up or down status to the LEMS. It | $EVSE_{1...n}$, LGR, FES |

TABLE 1.0-continued

Input data received at Inputs Sub-block 210-1

| Input Data | Description | Systems, Local Assets, sub-components, devices, subsystems, or External System |
|---|---|---|
| | may provide capacity to charge and discharge data (measured in power (W or kW)). The power capacity can include charging/discharging and active/reactive power. | |
| State of Charge (SoC), (i3) | Measurement data on state of charge (SoC), energy availability, and energy capacity for any device or subsystem any type of energy storage device in the system. | $EVSE_{1...n}$, LGR, FES |
| Input Source ID/Subsystem ID, (i4) | Identification data including source ID tied to an asset originator (asset input source). For example, input source ID could be EVSE 1, 2, 3, etc. The input may also include a subsystem ID. | $EVSE_{1...n}$, LGR, FES, Battery Controllers, Inverters, Converters, Transformers, Meters, Aggregation Platform, External Systems |
| EV ID and USER ID, (i5) | Identification data including electric vehicle identification and EV user identification including EV year, make, model, capacity, range, etc. | $EVSE_{1...n}$, EVs, EV users |
| Control Status, (i6) | Control status data on whether the local asset is controllable or non-controllable. | $EVSE_{1...n}$, LGR, FES, Battery Controllers, Inverters, Converters, Transformers, Meters |
| System ID | Unique system identification number | System at each local site |
| System Topology | System topology type: EVSE Local Power Topology, the LGR Local Power Topology, the FES Local Power Topology, the Multi-Mixed Local Power Topology, and the Distributed Local Assets (DLA)-Power Topology. | Entire System at each local site |
| Device Status | Status data availability status of the device including active/inactive, fault/error, local/remote, temperature, motion sensors, warning sensors, camera, video, and audio data, energy prices, etc. | $EVSE_{1...n}$, FES, LGR, Battery Controllers, Inverters, Converters, Transformers, Meters, aggregation platform, $3^{rd}$ party |
| Device Fault/Error | Device failure data including fault and error data for assets indicating device/system electrical errors or device/system communication loss. | $EVSE_{1...n}$, FES, LGR, Battery Controllers, Inverters, Converters, Transformers, Meters |
| Mobility | Status and informational data on mobility needs of the EV user . . . | EVs, EV users |
| Set points - Group function | Control data including set point or group functions indicating how the LEMS is to respond to deviations in different values. | $EVSE_{1...n}$, FES, LGR, Battery Controllers, Inverters, Converters, Transformers, Meters |
| Degree of Control | Control data from local assets relating to degree of control allowed for local assets and sub-components. | $EVSE_{1...n}$, FES, LGR, Battery Controllers, Inverters, Converters, Transformers, Meters |
| Aggregation Platform or $3^{rd}$ Party Cloud, (i8) | Control and informational data including set point data and content data from external sources such as the aggregation platform, 3rd party cloud, or grid server. | Aggregation Platform $3^{rd}$ Party External Systems |
| Recovery and Response Times | Recovery times and response times, including ramp up rates of all local assets and sub-components | $EVSE_{1...n}$, LGR, FES |
| Future Inputs, (i7) | Provides additional input ports for receiving data on future devices and subsystems at site 200. | $EVSE_{1...n}$, LGR, FES, Battery Controllers, Inverters, Converters, Transformers, Meters, Aggregation Platform, External Systems, Building management system, etc. |

All input data received at the inputs sub-block 210-1 subsequently routed to the data processing sub-block 210-3 for further evaluation, formatting, and processing by the LEMS 210. Table 1.0 provides a few examples of input data received by the LEMS 210 but are not limited to those input data and may include other inputs based on future monitoring and control requirements of the LEMS 210 and site 200. It is also noted that the power capacity inputs, transfer of power, and energy flow direction shown in Table 1.0 are not limited to active power but may also be applied to reactive power. In one aspect, the power capacity inputs may include but are not limited to charging and discharging, active power, reactive power, or any input devices connected therein as it relates to power. Measurement of active power inputs are generally captured in KVA's or VA or kilovolt amps while reactive power measurement are captured in VARs, mVARs, or kVARs.

Figure 10:
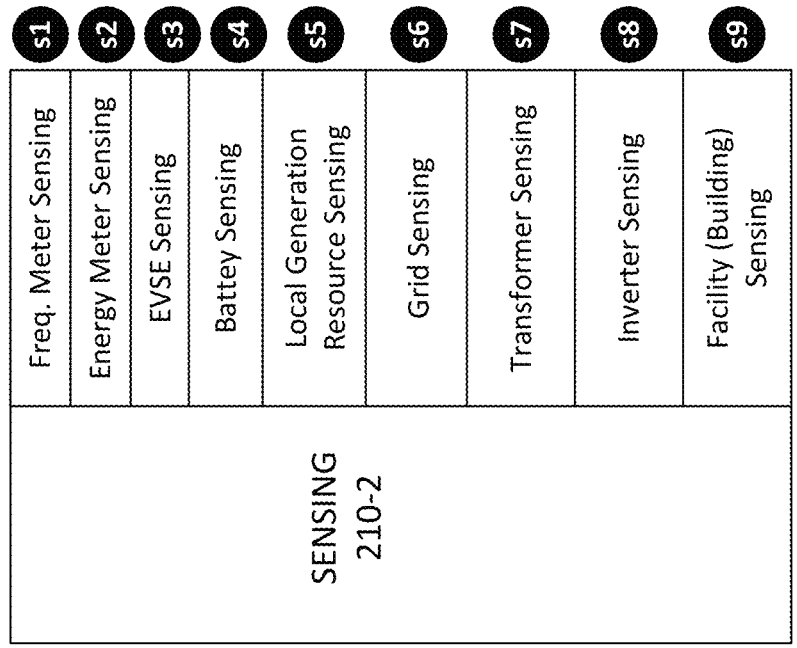
FIG. 10 depicts a sensing sub-block of the local energy management system (LEMS).
Figure 11:
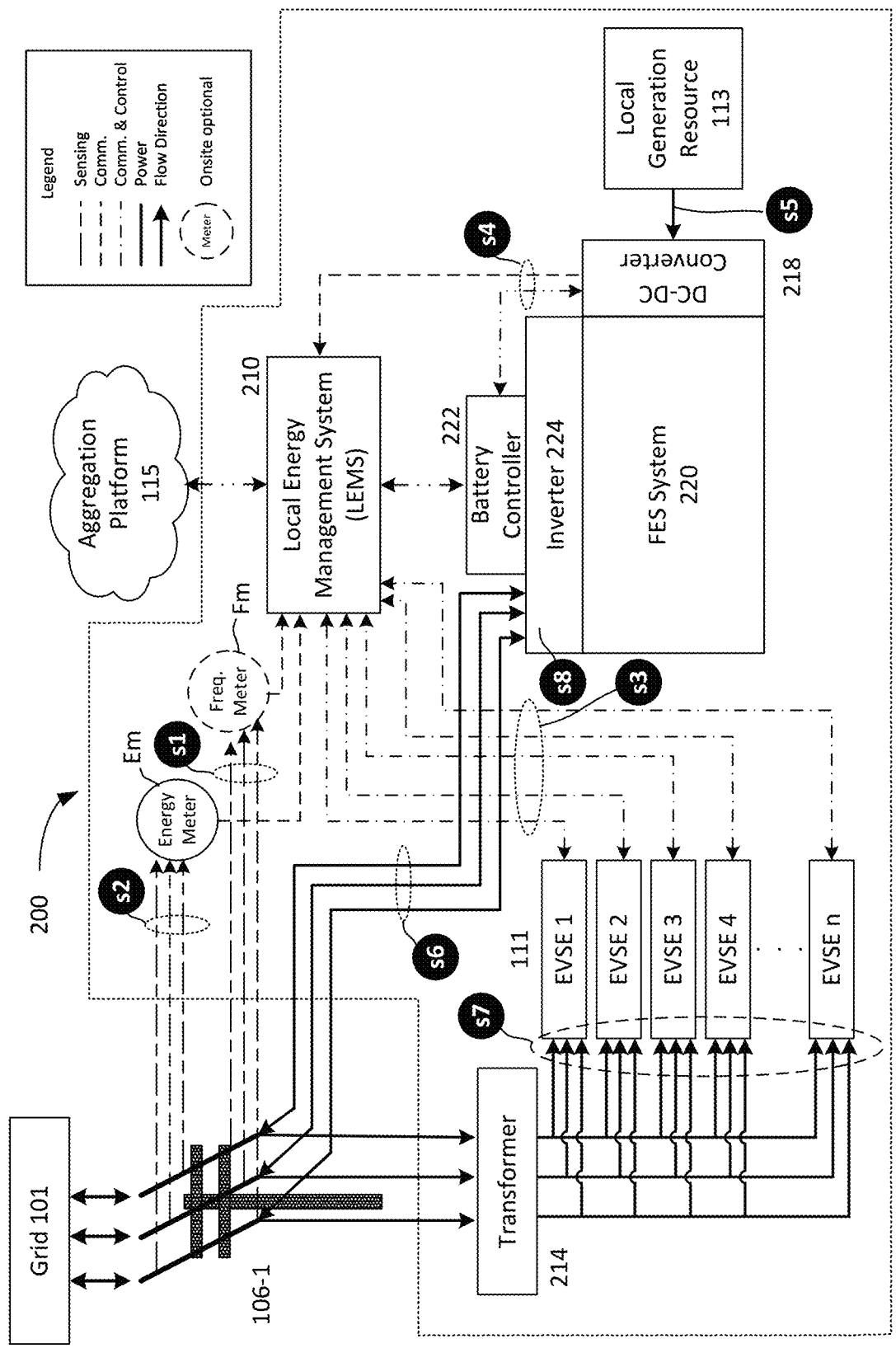
FIG. 11 depicts multiple sensing points measured by the sensing sub-block of the local energy management system (LEMS).

FIG. 10 illustrates the sensing sub-block 210-2 of the LEMS 210 having multiple sensing points (s1-s7), while FIG. 11 illustrates relative locations of these sensing points (s1-s9) at the local site 200, according to an implementation. The sensing sub-block 210-2 receives metering data from different sensing meters coupled to local assets and subsystems that are within its control area. In one aspect, the metering data reported by the sensing sub-block 210-2 effectively provides the LEMS 210 additional situational awareness of site 200, including real-time feedback, electrical measurement, and status conditions of all local assets and subsystems captured and reported by the different sensing meters. These sensing meters may include, for example, a frequency meter (Fm) and energy meter (Em) where these sensing meters could be applied to sensing points (s1-s9) of the site 200 as shown in FIG. 11. In addition, the site 200 may accommodate multiple frequency meters (Fm$_1$ ... Fm$_n$) and energy meters (Em$_1$ ... Em$_n$) at the sensing points (s1-s9) for sensing and measuring both frequency an energy data of local assets and subsystems at these points. Examples of electrical measurements captured and reported at sensing points (s1-s9) include voltages at different phases (single-phase, 3-phase), current, and instantaneous power, including but not limited to active power, reactive power, power capacity, power output, frequency of the grid, phase rotation, and power factor. In particular, the power capacity includes both charging (up) and discharging (down) of the battery.

The sensing sub-block 210-2 may also receive metering data from other sensing devices such as a vehicle or asset presence sensors located at the EVSE station 111 which may include but is not limited to vehicle sensor switches, cameras, PIR motion sensors, in-ground induction loops, radars, lasers, or rubber hoses filled with air which can detect whether or not vehicle has pulled up to EVSE station 111. The sensing sub-block 210-2 may also receive weather data from local weather sensor devices, including temperature, wind speed, wind direction, precipitation, barometric pressure, and relative humidity at the local site. The weather data may be captured by sensors physically present at the local level or provided by a 3rd party or an external weather data provider. In addition, the sensing sub-block 210-2 may receive date and time, angle of the sun, sunrise, sunset, and moon phases as well as other environmental phase data for correlating chronological data with power and energy data as determined by the LEMS 210. In one implementation, the different sensing meters may include stand-alone meters disposed between local assets and the LEMS 210 along communication paths, sensing paths, or power lines. In another implementation, each local asset may have an onboard sensing meter for directly capturing and reporting its current state and internal readings to the LEMS 210. All metering data received at the sub-block 210-2 are transmitted to data processing sub-block 210-3 for further processing. processed by the orchestration execution control sub-block 210-4, providing metering data of all local assets and external systems connected to the local site 200. Furthermore, the orchestration execution control sub-block 210-4 may control the duration, frequency, and flow of metering data by the energy meters, having the accuracy and refresh rate for understanding how often the readings are expected to be updated.

Figure 12:
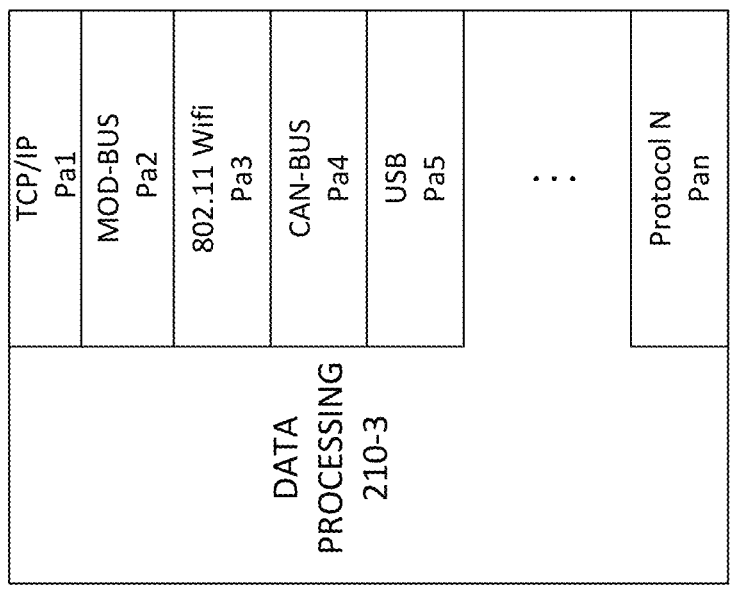
FIG. 12 depicts a data processing sub-block of the local energy management system (LEMS).

FIG. 12 illustrates the data processing sub-block 210-3 of the local energy management system (LEMS) 210, according to an implementation. In one aspect, the data processing sub-block 210-3 facilitates the transformation of all raw data (input data i1 ... i8 and metering data s1 ... s9) received by the LEMS 210, unifying and converting the raw data into a structured format that is interpreted and processed by the orchestration execution control sub-block 210-4. For example, the site 200 can have multiple input devices and sensing meters having different communication protocols (e.g., data formats, data packet, flow control, error handling, ACK, header information, etc.) which need to be interpreted by the LEMS 210. The data processing sub-block 210-3 allows the handling of different types of data formats and communication protocols via one or more protocol adapters Pa1 ... Pan) as shown in FIG. 12. Examples of protocols handled and adapted by the data processing sub-block 210-3 include but are not limited to TCP/IP, 802.11, MODBUS, IEC, CAN-BUS, and USB. Once the data processing sub-block 210-3 has converted the raw data into a common language for the orchestration execution and control sub-block 210-4, decision trees and algorithms are formulated and then executed by the LEMS 210, creating operational set points based on the processed input data, metering data, and objectives. Furthermore, the data processing sub-block 210-3 facilitates the transformation of these operational set points as determined by the orchestration execution control sub-block 210-4 into an appropriate protocol having a formatted data structure that is capable of being interpreted by the local power generating assets. sub-systems, sub-components, and devices at the local site.

The protocol adapters described herein may be implemented through custom algorithms or programming codes having procedures, functions, and routines for receiving, handling, transforming, and conveying specific protocols processed by the data processing sub-block 210-3. A pseudocode example of a protocol adapter procedure is provided in Table 2.0 below.

TABLE 2.0

Protocol Adapter Pseudocode Examples

```
procedure protocol_handler( )
Array A = array('i1', 'i2', 'i3',... 'i$_n$'); //Assign input data to array A
Array B = array('s1', 's2', 's3',... 's$_n$'); //Assign sensor data to array B
FOR EACH value i in A DO
   If (i contains 'input_protocol_type) {set $input_data to 'input_protocol_type;
unit_conversion_handler($input_data) ; } // raw input_data = 802.11, MODBUS, IEC, CAN-
```

TABLE 2.0-continued

Protocol Adapter Pseudocode Examples

```
BUS, USB, etc.
FOR EACH value s in B DO
   If (i contains 'sensing_protocol_type) {set $ sensing_data to 'sensing_protocol_type;
unit_conversion handler($sensing_data) ; } // raw sensing_data = 802.11, MODBUS, IEC,
CAN-BUS, USB, etc.
FUNCTION unit_conversion_handler($raw_data) {
$protocol_converted = transform($raw_data); // convert input and/or sensing data into
standardized structured format;
return $protocol_converted;
```

Figure 13:
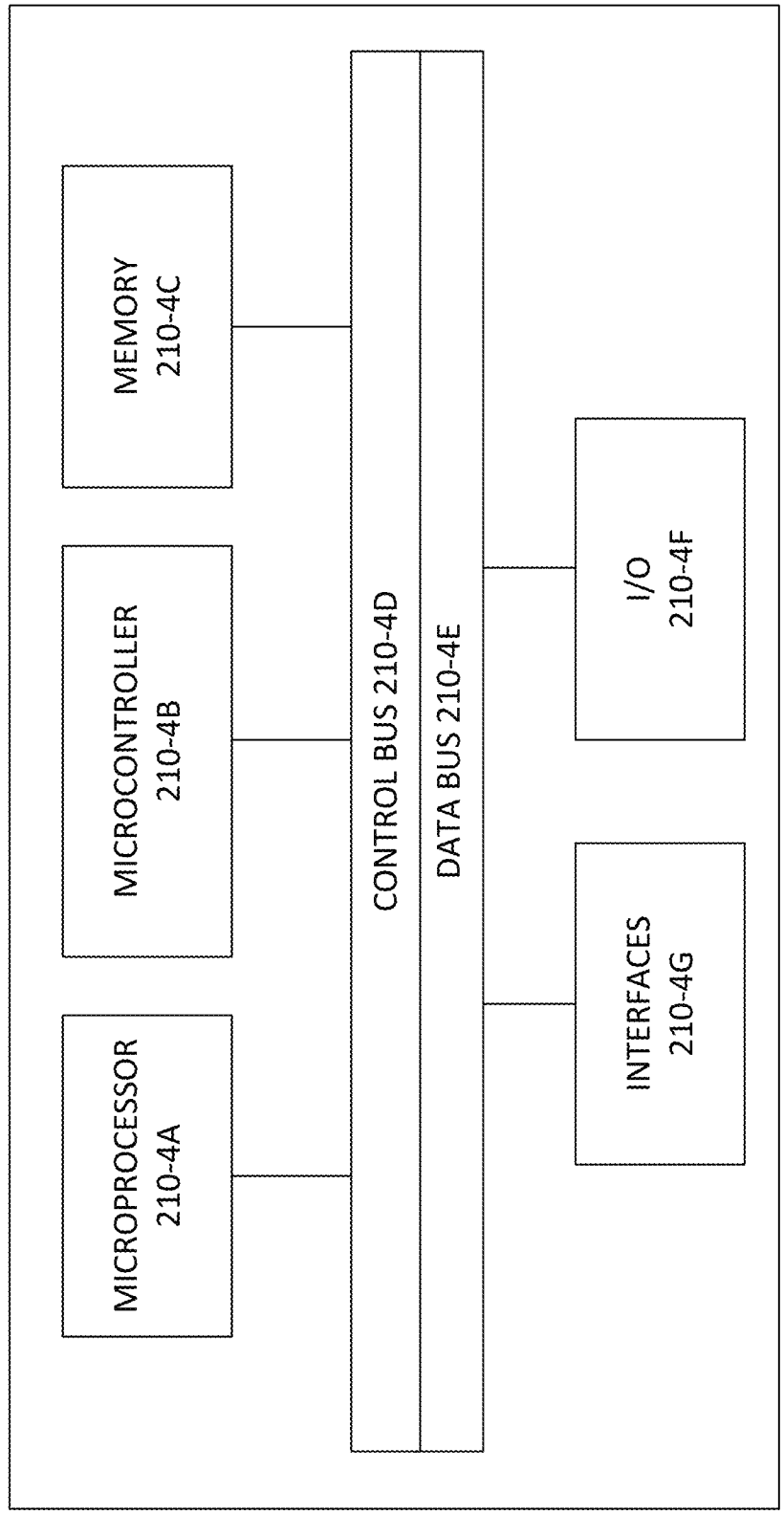
FIG. 13 depicts the orchestration execution and control sub-block of the local energy management system (LEMS).

FIG. 13 illustrates the orchestration execution and control sub-block 210-4 of the local energy management system (LEMS) 210, according to an implementation. The orchestration execution control sub-block 210-4 comprises one or more microprocessors 210-4A for executing a set of instructions that generates, determines, and conveys operational set point commands to each local asset and subcomponents, thereby controlling each local asset in order to meet the objective at the local site 200. Other microprocessor components for supporting data processing and executing these instructions in sub-block 210-4 include but not limited to, for example, microcontroller 210-4B, read/write memory 210-4C, control bus 210-4D, data bus 210-4E, I/O 210-4F, and interfaces 210-4G, where these microprocessor subcomponents facilitate the exchange of data with other sub-blocks (inputs sub-block 210-1 and sensing sub-block 210-2) in order to effectuate set point commands of the LEMS 210. The set point commands can be based on real-time power constraints and local asset configurations (controllable/non-controllable, power capacity, SoC, etc.) received by the LEMS 210 at inputs sub-block 210-1 and sensing sub-block 210-2. For example, the orchestration execution control sub-block 210-4 of the LEMS 210 may receive and analyze formatted input data and metering data from the data processing sub-block 210-3 and, based on the objective of the site 200, the orchestration execution control sub-block 210-4 formulates, determines, and then generates one or more set points and control signals that are subsequently conveyed to the mixed local assets (EVSEs, FES, LGR, FMS) and subcomponents in order to meet objective of the site 200. In other embodiments, the set points, instructions, commands, and objectives of the system described herein may be determined and executed by the aggregation platform 115 instead of the LEMS 210, acting as a backup system to the LEMS 210, and allowing the site 200 to operate and control the local assets, thereby bypassing the LEMS 210.

The energy or electrical objective received by the LEMS 210 at a local site, subsystem of the site, or sub-component of the site is defined herein as one or more desired energy or electrical targets including but not limited to power factor, voltage, current, frequency, reactive/active power, energy, and/or phase angle having a supply or demand requirement (e.g., charging or discharging) in response to a grid condition. In one instance the objective may be initiated by external entities, such as the aggregation platform 115 or external systems (3 rd party systems), and then conveyed to the LEMS 210 for further processing of the objective. In another instance, objectives may be determined internally by the LEMS 210 based on conditions at the local site determined by input and sensing data. In response to an objective received by the LEMS 210, operational set points are determined based on the real-time power conditions and power configuration at that local site, and subsequently conveyed to the local assets (EVSEs, LGR) and subcomponents via data and control signals transmitted over the communication and control lines. Accordingly, these set points are configured to dynamically and automatically adjust one or more operational states and power delivery settings of the local assets (EVSEs, LGR) and subcomponents in order to meet the objective at that local site. Examples operational states include but are not limited to enable or disabling power, adjusting or throttling charge or discharge power, or any other power settings all within power capacity and availability limits of each local asset. In the case of EVSE's, these constraints can also include the mobility needs of the user. For example, one objective received by the LEMS 210 may include discharging 100 kW of power to the local site from the grid 101, while another objective could include delivering 200 kW of charge generated by the local site to the grid 101. In both cases, operational set points are formulated by the LEMS 210 (or external entity) according to their given objective (e.g., 100 kW discharge or 200 kW charge), and then conveyed to the local assets and subcomponents, having their operational states and power charge and discharge control settings automatically adjusted based upon these set points in order meet these objectives. Another objective can include meeting power delivery requirements in relation to deviations in the grid supply and demand conditions. Still, other objectives can include meeting target energy consumption or target power limit that is not to be exceeded, meeting grid balancing requirements as determined by the aggregation platform 115, and meeting power requirements for any grid services from grid 101 such as voltage regulation demands or other metering data as measured by the metering sensors (Em, Fm), sending this metering data to the LEMS 210 in order to dynamically respond to certain power deviations in the grid 101. Furthermore, the aggregation platform 115 may group operational set points into a group function based on the input data it receives from the grid 101, breaking up multiple objectives into a group of set points and controls that are conveyed to one or more local mixed power generation sites (200-1, 200-2, . . . , 200-n).

In another example, the aggregation platform 115 may have an objective to discharge at 200 kW of power at local site 200-1 to the grid 101. In this example, there are multiple EVs at the EVSE station 111 charging at −300 kW while a surplus of 100 kW of solar power is being generated by the LGR 113 and discharged by the battery. In response to this objective, the LEMS 210 can determine, generate, and convey operational set points to the battery in the FES system 220 causing it to discharge the battery at 500 kW based upon the input data and sensing data it receives from all the local assets (EVSEs, battery, LGR, and FES system). At these operational set points, the objective is thereby achieved by leveraging and aggregating the power from the mixed local assets (EVSEs, LGR). In other cases the aggregation platform 115 may perform energy management for the purposes of bill savings and revenue generation by monitoring and controlling all of the sites (**200-1, 200-2, . . . , 200-*n*), limiting them to certain power threshold so that sub-systems at each local site do not exceed this threshold as a group. Ideal energy settings across all local sites (200-1, 200-2, . . . , 200-*n*) may be calculated by one or more optimization algorithms performed and executed by the aggregation platform 115**, external entity or any other third party systems.

In another case, the aggregation platform 115 may monitor frequency in real-time and respond to frequency deviation at the local site level by generating and conveying a frequency objective at the local site. Based on this frequency objective as well as current input data and metering data measured at the local site, the LEMS 210 or aggregation platform 115 may determine, generate, and convey operational set points to the local assets to dynamically adjust them in order to meet this frequency objective at the local site. In calculating these operational set points, the LEMS 210 may take into consideration the various states at each local asset such as different loads, the battery capacity, state of charge, how much energy is available at the local site by adding up all the energy devices, and whether or not those energy devices are controllable at any point in time, and, if they are, to what extent are they controllable. In addition, the LEMS 210 may take into consideration other conditions at the local site to make its calculation, including energy capacity states such as power capacity to charge and power capacity to discharge.

An exemplary pseudocode for calculating and determining set points by the LEMS is provided in Table 3.0 below.

TABLE 3.0

| Pseudocode - Generating Set Points (SPn) by the LEMS |
|---|
| //Generate Set Points by the LEMS - Start//<br>//Receive and store one or more objectives from aggregation platform<br>If (!empty($ ['AggPlatOBJ']))<br>{<br>$objective = $ ['AggPlatGoal'];<br>write($file, $objective);<br>close($file);<br>}//end if<br>// Receive and store inputs from input block ($i_n$) and sensing block ($s_n$);<br>If (!empty($[$i_n$]) OR (!empty($[$s_n$]))<br>{<br>$i = ($[$i_n$]); $s= ($[$s_n$]);<br>write($file, $i, $s);<br>close($file);<br>}//end if<br>//Call protocol_handler to convert input data and sensing data from local assets and subcomponents to LEMS;<br>procedure protocol_handler($i_n$, $s_n$) ;<br>//Determine set points based on received objectives, input data, and sensing data;<br>function calc_setpoints($objective, $i, $s) {<br>$SPi_n$ = {setpointEQ[$objective, $i]} //determine set point based on $objective and $i;<br>generate control setting instructions to target system (local assets, subcomponents)<br>$SPs_n$ = { setpointEQ[$objective, $s]} //determine set point based on $objective and $s;<br>generate control setting instructions to target system (local assets, subcomponents)<br>return ($SPi_n$, $SPs_n$)<br>}//function<br>//Call protocol_handler to convert output protocols from LEMS to appropriate format for local assets<br>procedure protocol_handler($SPi_n$, $SPs_n$)<br>//Convey control settings instructions to appropriate local assets and sub-components based on set points<br>function send_output($SPi_n$, $SPs_n$) {<br>xmit($SPi_n$, $SPs_n$, $localAsset1, $ localAsset1, ....,$ localAsset$_n$))<br>} //end procedure<br>//Generate Set Points by the LEMS End//<br>//Group Set points Function<br>function send_groupSetPoints_output($SPin, $SPsn) {<br>xmit_group_SPn($SPi_n$, $SPs_n$, $localAsset1, $ localAsset1, ... ,$ localAsset$_n$))<br>} //end procedure |

Examples of conveyance of set points instructions for automatically controlling power settings on targeted systems to meet objectives are provided in Table 4.0 below.

TABLE 4.0

| Objectives, Set Points, Targeted System, and Conveyance of Instructions | | | |
|---|---|---|---|
| Objective at Local Site | Set Points (SPn) # | Targeted Systems (Local Assets, subcomponents) | Set Point Instructions conveyed to targeted systems |
| Discharge100 kW of power | $SP_1$ | $EVSE_{1...n}$ | Change $EVSE_{1...n}$ operational states (enable, disable power) Change power settings of $EVSE_{1...n}$ (power input, output) |

TABLE 4.0-continued

Objectives, Set Points, Targeted System, and Conveyance of Instructions

| Objective at Local Site | Set Points (SPn) # | Targeted Systems (Local Assets, subcomponents) | Set Point Instructions conveyed to targeted systems |
|---|---|---|---|
| Deliver 200 kW of charge | $SP_2$ | LGR | Change LGR operational states (enable, disable power) Change power settings of LGR (power input, output) |
| Discharge 500 kW of power | $SP_3$ | FES | Change FES operational states (enable, disable power) Change power settings of FES (power input, output) |
| Deliver 300 kW of charge | $SP_4$ | $EVSE_{1...n}$, LGR, FES | Change $EVSE_{1...n}$, LGR operational states (enable, disable power) Change power settings of $EVSE_{1...n}$, LGR (power input, output) |
| Discharge 750 W of power | $SP_5$ | LGR, FES | Change LGR, FES operational states (enable, disable power) Change power settings of LGR, FES (power input, output) |
| Deliver 1 MW of charge | $SP_6$ | FES | Change FES operational states (enable, disable power) Change power settings of FES (power input, output) |
| Grid balancing | $SP_7$ | $EVSE_{1...n}$, LGR, FES | Change $EVSE_{1...n}$, LGR, FES operational states (enable, disable, throttle power) Change power settings of $EVSE_{1...n}$, LGR, FES (power input, output) |
| Local Power Threshold Limits (e.g., keep local site consumption under 1 MW) | $SP_8$ | $EVSE_{1...n}$, LGR, FES | Change $EVSE_{1...n}$, LGR, FES operational states (enable, disable power, charge/discharge, or adjust other power settings) in order to meet threshold based upon objective at local site. Change power settings of $EVSE_{1...n}$, LGR, FES (power input, output) |
| Deliver 1 MW of charge | Group Function: ($SP_1$, $SP_2$, $SP_5$) | $EVSE_{1...n}$, LGR, FES | Group function affecting multiple targeted systems to change operational states to meet objectives at local site |

All methods, functions, and procedures described herein may be implemented through one or more device level, component level, or system level programming languages, including but not limited to C, C++, C #, Java, Python, ADA, assembly language, Verilog, VHDL, and the like. Furthermore, while the foregoing objectives are described in some detail with specific reference to various embodiments of the LEMS 210 and aggregation server 115, there is no intent to limit the LEMS 210 to these particular objectives, implementations of determining these objectives, or to any specific alternatives thereof.

Figure 14:
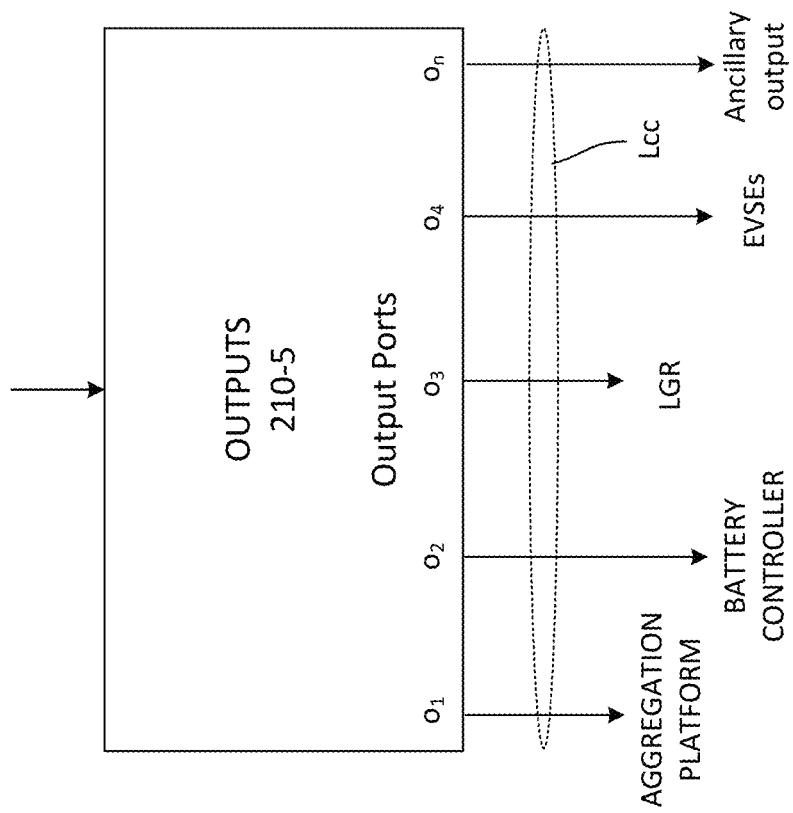
FIG. 14 depicts the outputs sub-block of the local energy management system (LEMS).

FIG. 14 illustrates the outputs sub-block 210-5 of the local energy management system (LEMS) 210, according to an implementation. The outputs sub-block 210-5 may comprise an output interface unit having multiple data communication links and channels for transmitting output signals which carry output data generated and conveyed by the LEMS 210 to the local assets, subcomponents, and external systems available at the site level. The output interface unit may be configured to transmit analog signals, transmit digital signals, transmit and convert analog signals into digital signals, and vice-versa, having output data that has been converted into one or more protocol formats (via the data processing sub-block 210-3) which are communicatively adapted and interpreted by the local assets, subcomponents, and external systems available at the site level. In one aspect, the output data in outputs sub-block 210-5 contains one or more operational set points commands for controlling and setting each local asset including, for example, curtailed commands or charge/discharge commands. In another aspect, the output data in outputs sub-block 210-5 may contain messaging information providing system and asset information and device status information that are reported to the aggregation platform 115 or the external system.

In one embodiment, after the outputs sub-block 210-5 receives set point commands from the orchestration execution control sub-block 210-4, the set point commands are then separated and channeled into output ports ($o_1 \ldots o_n$) that are routed to the each local asset or external system via communication and control links Lcc for dynamically setting and controlling local assets and subcomponents (e.g., LGR, EVSEs, battery controller, etc.) or communicating messaging information to external systems (e.g., aggregation platform, $3^{rd}$ part system). For example, the outputs sub-block 210-5 may receive power and current set point commands from the orchestration execution control sub-block 210-4 at ports $o_3$ and $o_4$, routing these set point commands to the LGR and EVSEs via communication and control links Lcc, and causing these assets to ramp down power generation, ramp up power generation, or curtail them based upon the objective of the site 200. In another embodiment, the outputs sub-block 210-5 can receive set point commands from the orchestration execution control sub-block 210-4 at output ports $o_1 \ldots o_n$ for curtailing loads. In yet another embodiment, the LEMS 210 is not involved in the process of making energy calculations or determining operational set points, acting only as a pass-through device. In this case, the aggregator platform 115 is fully in control of determining and generating all operational set points at the site 200. Those operational set points are then relayed to the local assets at each local site and can either be on the AC side or the DC side. Operational set points of the aggregator platform 115 may include power, current or curtailment set points that are relayed to each local asset, bypassing the LEMS 210. In other cases, the power could be active power, reactive power, or a combination of active power and reactive power.

In another embodiment, the orchestration execution control sub-block 210-4 may occasionally need to generate and transmit status, energy capacity, control, and other messaging information to the aggregator platform 115 or other external entities, reporting status and configuration settings of the local assets at the local site. This messaging information may be transmitted from the orchestration execution control sub-block 210-4 to the aggregator platform 115 via output port $o_1$ of outputs sub-block 210-5. The messaging information may include site status data which informs the aggregator platform 115 the current state at the local site 200 in real-time, both at the aggregation level, site level, and local asset level, providing the aggregator platform 115 applicable visibility of the entire site 200 including events at the local asset level, if needed. For example, the LEMS 210 may capture and record one or more EV 108 having EV identification data (e.g., EV ID, arrival/departure times, charge capacity, charge modes—unidirectional/bidirectional, etc.) at the EVSE station 111, charging at one or more EVSEs, and having dynamic and unpredictable arrival and departure times. This EV identification data may be routed from the LEMS 210 to the aggregator platform 115 via the aggregation output port ($o_1$) contained in the outputs sub-block 210-5. Once received by the aggregator platform 115, an accumulation of statistical data, performance data, and site analysis correlation data can be collected from the EV identification data to further optimize the power generation produced at the local site.

LEMS Site Level Operational Example—Objective Set by Aggregation Platform

A step-by-step operational overview of the LEMS 210 at one of the local sites 200-1 is discussed in this section and in FIG. 2A. In one instance, the LEMS 200 may communicate its power energy capacity to the aggregation platform 115 via an energy capacity messaging data that is routed through the aggregation platform output port $o_1$ disposed in sub-block 210-5 of the LEMS 210. Based on this power energy capacity available at the local site 200-1, the aggregation platform 115 may select the local site 200-1 according to one or more objectives for grid services. Upon selection, the aggregation platform 115 generates and conveys an objective (or command) to the LEMS 210 at the local site 200-1, instructing it to discharge 100 kW of power to the grid 101. Before the LEMS 210 receives any objectives from the aggregation platform 115, it is already aware of the charging state, activity, controllability, charge capacity, and availability of every single local asset (EVSEs, LGR, inverters, transformers, etc.) at the local site based on input data and metering data received at the inputs sub-block 210-1 and sensing sub-block 210-2, respectively. In other words, based on the input data and metering data at sensing points (s1-s7) received and analyzed by the LEMS 210, it can determine exactly what each local asset is doing, and whether or not these local assets and subcomponents are controllable or not, and if controllable, to what extent can they be controlled. Furthermore, the LEMS 210 can determine the current state at the local site, including availability of local assets, asset control status, asset configuration, power capacity, and energy flow states at each local asset.

After the LEMS 210 has received the objective from the aggregation platform 115, it takes the input data and metering data and determines that additional power resources (e.g., one or more EVs 108) is available at the EVSE charging station 111 at time $t_0$. From the input data received at time $t_0$, the LEMS 210 has also determined that EVSE 1 is unidirectional, EVSEs 2, 3 that are bidirectional, EVSE 4-n are empty. From the input data it has received from the inputs sub-block 210-1, the LEMS 210 has determined that EVSE 2 is bidirectional but not controllable, performing a 50 kW discharge, EVSE 1 is unidirectional, controllable, and charging at −10 kW, while EVSE 3 is idle with no EV present or connected. In addition, the LEMS 210 has also determined that there is available power generation from the LGR 113 of 200 kW, the battery 220 is at 60% SOC, and the inverter 224 is capable of handling up to 1 MW of power, based on sensing data measured at sensing points (s4, s5, s8) at sensing sub-block 210-2. The LGR 113 provides power to the EVSEs via the FES and battery 220.

At this local site, a total load of −160 kW is being consumed from one or more assets therein including, for example, −10 kW from EVSE 1, −50 kW from EVSE 2, −100 kW reported by the FMS 301 for buildings 1 and 2. With 200 kW of power being generated by the LGR 113 and discharged to the FES 220 through the inverter 224, the power level seen at energy meter (Em) is now the sum of −160 kW and 200 kW (or 40 kW) that is available and injected into the grid. Since the aggregation platform 115 has an objective of 100 kW and 40 kW is seen at energy meter (Em), a total of 60 kW discharge (100 kW objective −40 kW at Em) is remaining in order to meet the objective of the aggregation platform 115 for the grid services. To meet the remaining 60 kW objective, the LEMS 210 can analyze all input data and sensing data from the local assets and subcomponents at the local site, determining which local assets are controllable and not controllable, determining the preferred operating set points for each local asset and sub-component, and then conveying these set points to alter the operating settings of the local assets and sub-components. In this example, EVSE 2 is bidirectional and not controllable, EVSE 1 is unidirectional, controllable, and charging at 10 kW, while EVSE 3 is also bidirectional but sitting idle (no vehicle present and charging). Since EVSE 1 is controllable, the LEMS 210 can initiate a set point command to EVSE 1 to reduce the 10 kW charge drawn by EVSE 1 to 0 kW, providing an additional 10 kW at the local site out of the 60 kW required by the aggregation platform 115. Furthermore, the LEMS 210 can initiate a command to the inverter 224 and the battery 220 to increase its discharge by 50 kW (totaling 250 kW discharge), providing the total power delivery objective requirement of 100 kW by the aggregation platform 115 for grid services.

As shown in the foregoing example, the local site operates under a dynamic environment where electric vehicles EVs are plugged into the EVSE station 111 at various times of the day having dynamic arrival and departure times at the local site. Under this dynamic environment, the LEMS 210 is able to continuously track in real time the current state and condition at the local site, how many and what type of EVs are being plugged into EVSE station 111, whether these EVs are controllable or not controllable, how much energy capacity is available from each EV at the EVSE station 111, and charging and discharging conditions at the local site. Based on the current state of the environment at the local site, the LEMS 210 is able to control and make the necessary power adjustments via set points to each controllable local asset at the local site in order to meet objectives defined by the aggregation platform for grid service demands.

System Power Capacity Limitations—Continuous Monitoring

In some cases, the local assets (EVSEs and LGR) may have limited power supply or load capacity which may limit its ability to meet certain objectives of the aggregation platform 115. For example, the aggregation platform 115 may send set points to the LEMS 210 at a local site, requesting the LEMS 210 to update operational settings of each local asset in order to meet a predetermined objective. However, based on the capacity limitations of the local assets at the local site, the LEMS 210 reports to the aggregation platform 115 that the set point conditions cannot be applied to the local asset at the local site due to the current power capacity constraints (e.g., a depleted or full energy device) of one or more local assets.

The LEMS 210 is continuously monitoring and querying the local assets via inputs block 210-1 and sensing sub-block 210-2 and calculating the current power capacity at the local site, updating and reporting status information to the aggregation platform 115. The reporting of status information to the aggregation platform 115 may be performed on a predetermined schedule, set time interval, or in real-time. By continuously monitoring the local site, the LEMS 210 has a real-time awareness and management over controllable local assets and sub-components, determining appropriate set points that meet power supply and/or demand requirements defined by aggregation platform 115. For example, if the LGR 113-1 at the local site 200-1 comprises a solar panel power generating system, the power supplied by the LGR 113-1 are constantly changing due to weather conditions and other temporary obstructions (e.g., time of day, angle of sun, clouds, aircrafts, balloons, or other air traffic obstructions). Due to these potential obstructions, power generation from the LGR 113-1 may instantly and temporarily drop, reducing power capacity for this local asset at the local site. The reduction in power generation for this particular asset is immediately detected by the LEMS 210-1 which reports the curtailed power capacity at the local site 210-1 to the aggregation platform 115. In response, the aggregation platform 115 can dynamically transmit and allocate objectives to the other LEMS (210-2, 210-3, . . . , 210-n) disposed at the other sites (200-2, 200-3, . . . , 200-n) and automatically adjust power settings to targeted systems, in order to meet the objectives and satisfy the supply and load requirements for grid services.

Fault Handling Example—Loss of Communication of One or More Local Assets

In some cases, faults and communication between one or more local assets and the LEMS 210 can occur if the local asset is in an error state or unreachable over a communication network. For certain fault conditions, the LEMS 210 can leverage the energy meter (Em) to estimate power capacity from the local assets that are unable to communicate directly with the LEMS 210. For example, in the event that EVSE 4 and the LGR 113 are both operable but has lost communication with the LEMS 210, power capacities from these local assets can be extrapolated by the calculating the power differences measured between remaining local assets (EVSE 1-3 . . . n, FES System) and the energy meter (Em) which are still communicating with the LEMS 210. In other words, the LEMS 210 can extrapolate the power capacity measurements of EVSE 4 and the LGR 113 by subtracting the power capacity measured at the available energy meter (Em) from the cumulative power capacities at the other available local assets, even though it cannot control or communicate with the lost assets directly. Furthermore, the LEMS 210 can adjust set points to all controllable local assets at the local site and apply these extrapolated power capacity measurements for optimization of the entire local site.

Example Method of Performing Grid Services by the LEMS

Figure 15:
FIG. 15 depicts flowchart and method of performing grid services by the local energy management system (LEMS) and the mixture local power generating assets at one or more local mixed power generation sites.

FIG. 15 illustrates a method 1500 for performing grid services by the LEMS 210 and mixture local power generating assets in order to meet one or more objectives at the local mixed power generation site. Method 1500 begins at step 1502 receiving, by the LEMS 210, one or more objectives from an external entity, including but not limited to the aggregation platform 115, an external third party, or external systems. As describe herein above, objectives may generally define a local site's electrical target (power factor, current, reactive/active power, etc.) having a power supply or demand requirement (e.g., charging or discharging) in response to a grid condition. Examples of some objectives are also described with respect to Table 4.0 previously presented in this disclosure. Note that while step 1500 refers to performing a single LEMS at one of the local mixed power generation site, the method 1500 may further include multiple LEMS (210-1, 210-2, . . . 210-n), as described above with respect to FIG. 1, operating at different local sites (200-1, 200-2, . . . , 200-n), and performing multiple grid services simultaneously or at different times according to objectives received at each local site.

Method 1500 proceeds to step 1504 with receiving, by the LEMS 210, incoming raw data, including but not limited to 1) input data from local assets, sub-components, and external entities; and 2) sensing data from metering devices operating in the system 200 at the local site. In general, the input data and sensing data can provide the LEMS 210 status, capability, and operational data from all local assets, sub-components, and metering devices which can be measured in real-time or as historical data based on network and communication statuses, providing operational awareness of all local power generating assets and devices disposed at the local site to the LEMS 210. Examples of the input data and sensing data discussed above are also described with respect to Table 1.0 and FIGS. 9-11. In addition, the input data may receive command and instructional data from external entities such as the aggregation platform 115 to which the LEMS 210 may initiate an appropriate response, such as eliciting one or more commands to one or more local power generating assets under its reach and control. Furthermore, the LEMS 210 may receive request data from the external entity, including but not limited to system identification data, system configuration, system availability, system capability data, or system status updates, allowing the external entity (e.g., aggregation platform 115) to determine which commands are appropriate for a given local site 200 based on its configuration, availability power capability, and so on.

Method 1500 then proceeds to step 1506 with transforming, by the LEMS 210, the incoming raw data into a structured format via one or more protocol adapters. In some embodiments, transforming the incoming raw data is executed by the data processing sub-block 210-3 which facilitates the transformation of all raw data (input data i1 . . . i8 and metering data s1 . . . s9) received by the LEMS 210, unifying and converting the raw data into a structured format that is interpreted and processed by the orchestration execution control sub-block 210-4. In other embodiments, the data processing sub-block 210-3 also facilitates the transformation of operational set points determined by the orchestration execution control sub-block 210-4 into an appropriate protocol having a formatted data structure that is capable of being interpreted by the local power generating assets. sub-systems, sub-components, and devices at the local site. Examples of the data processing sub-block 210-3 and the protocol adapter discussed in this section are also provided Table 2.0 and FIG. 12 previously presented in this disclosure.

Method 1500 then proceeds to step 1508 with generating, by the LEMS 210, one or more set points based upon the one or more objectives and incoming raw data. As above, generating may generally include calculating and determining a single set point command or group of commands according to the one or more objectives and incoming raw data. The data processing and execution of these set point commands are handled by the orchestration execution control sub-block 210-4 of the LEMS 210. Implementations and examples of the orchestration execution control sub-block 210-4 and set point commands discussed in this section are also provided Table 3.0 and FIG. 13 previously presented in this disclosure.

Method 1500 then proceeds to step 1510 with conveying, by the LEMS 210, the one or more set points to one or more local power generation assets, subcomponents, or devices. Once the set points are determined by the orchestration execution control sub-block 210-4, the data processing sub-block 210-3 may further facilitate the transformation of these set points into an appropriate protocol having a formatted data structure that is capable of being interpreted by the targeted systems (e.g., local power generating assets. sub-systems, sub-components, and devices) at the local site. Once conveyed, these set point commands may automatically adjust operational power settings of each targeted system at one or more operational set points as determined by the LEMS 210. Implementations and examples of the conveyance of set points to targeted systems discussed in this section are also provided Table 4.0 previously presented in this disclosure.

Method 1500 then proceeds to step 1512 with performing, by the mixture of local power generating assets, one or more grid services in order to meet the one or more objectives. In response to automatically adjusting operational power settings of each targeted system, the objective defined by the external entity may be achieved by leveraging and aggregating the charging and discharging of power from a mixture and combination of local power generating assets.

Method 1500 then proceeds to step 1514 with transferring, by the mixture of local power generating assets, power between the mixture of local power generating assets and the power grid, and thereby satisfying the one or more objectives at the local mixed power generation site.

In another embodiment, performing grid services may include but is not limited to performing energy management for the purposes of bill savings and revenue generation by monitoring and controlling all of the sites (200-1, 200-2, ..., 200-n), limiting them to certain power threshold so that sub-systems at each local site do not exceed this threshold as a group. As above, a notable benefit of the LEMS 210 is its ability to utilize loads, supplies, and power capacities from a mixture of local power generating assets including but not limited to EVSE systems, LGR systems, FES systems, and Facility Management Systems (FMS).

LEMS Power Topology Schemes

FIGS. 16-20 illustrate other viable power topologies in which the LEMS 210 may operate, manage, and control one or more groups of local power generating assets. Each power topology presented in the drawings demonstrates various configurations of local power generating assets and LEMS that may operate at a given local site. These power topologies may allow a site planner the flexibility and several options to design and choose an appropriate power configuration in order to meet local site conditions and constraints such as any site regulations, ordinances, or other factors which may inhibit the use of certain local power generating assets (e.g., EVSE's, LGR systems or FES systems) to be present at the local site. In addition, such power topologies and configurations are not intended to be limiting in scope, design, number of local power generating assets and/or LEMS applied at each site, or interconnections, methods, or applications which facilitate the power transfer and communication to and from the grid.

Figure 16:
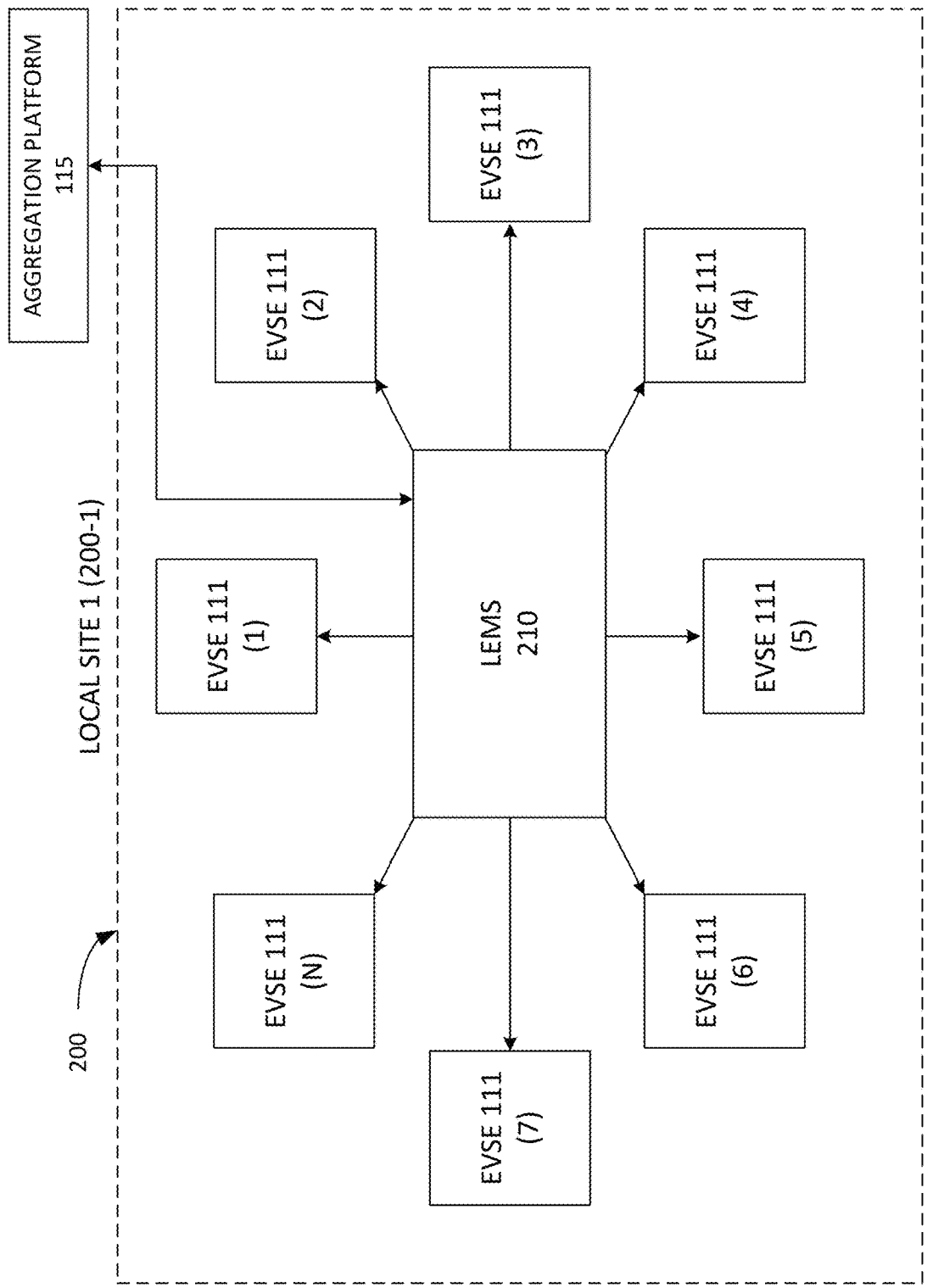
FIG. 16 depicts a LEMS-EVSE Local Power Topology.

FIG. 16 depicts an EVSE Local Power Topology at local site 1 (200-1) having multiple EVSE stations 111 (1-N) in communication and under the control of the LEMS 210. For example, at local site 1, the system 200 and LEMS 210 may leverage the use of a multi-EVSE's system to supply and meet objectives determined by the aggregation platform 115. Each EVSE station 111 (1-N) may have a fixed number of EVSE's (EVSE$_{1...n}$) based on space availability and zoning regulations at the local site. The aggregation platform 115 in connection with the LEMS 210 may identify the EVSE power topology and power delivery capabilities based on its configuration (i.e., EVSE only system), allowing tailored objectives to be conveyed to this site. For example, since the multi-EVSE's system can support both supply and load demands, the aggregation platform 115 may transmit objectives including groups of charging and discharging instructions to the LEMS 210 which, in response, generates and conveys set point commands to one or more EVSEs.

Figure 17:
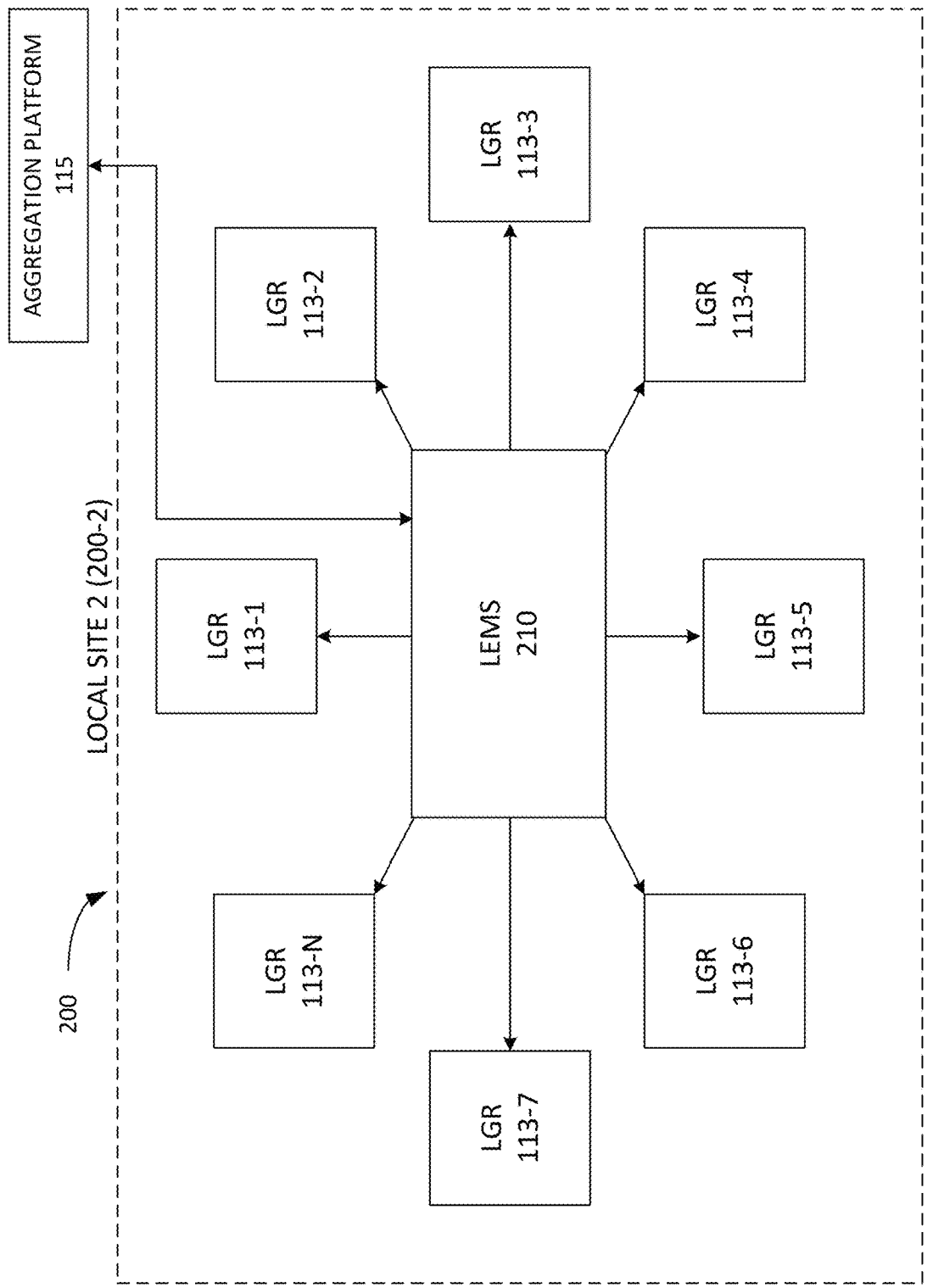
FIG. 17 depicts a LEMS-LGR Local Power Topology.

FIG. 17 depicts a LGR Local Power Topology at local site 2 (200-2) having multiple LGR systems 113 in communication and under the control of the LEMS 210. In the multi-LGR configuration, the system 200 and LEMS 210 may effectively manage and control a plurality of local generation resources (LGRs 113-1 ... 113-N), including but not limited to a mixture and combination of solar, wind, geothermal and hydro generation power sources. The LEM-LGR system may fixed number of LGR's based on space availability and zoning regulations at the local site. The aggregation platform 115 in connection with the LEMS 210 may identify the LGR power topology and power delivery capabilities based on its configuration (i.e., LGR only system), allowing tailored objectives to be conveyed to this site. For example, since the LGR systems can only support supply demands, the aggregation platform 115 may transmit objectives including groups of charging instructions to the LEMS 210 which, in turn, generates and transmits set point commands to one or more LGRs.

Figure 18:
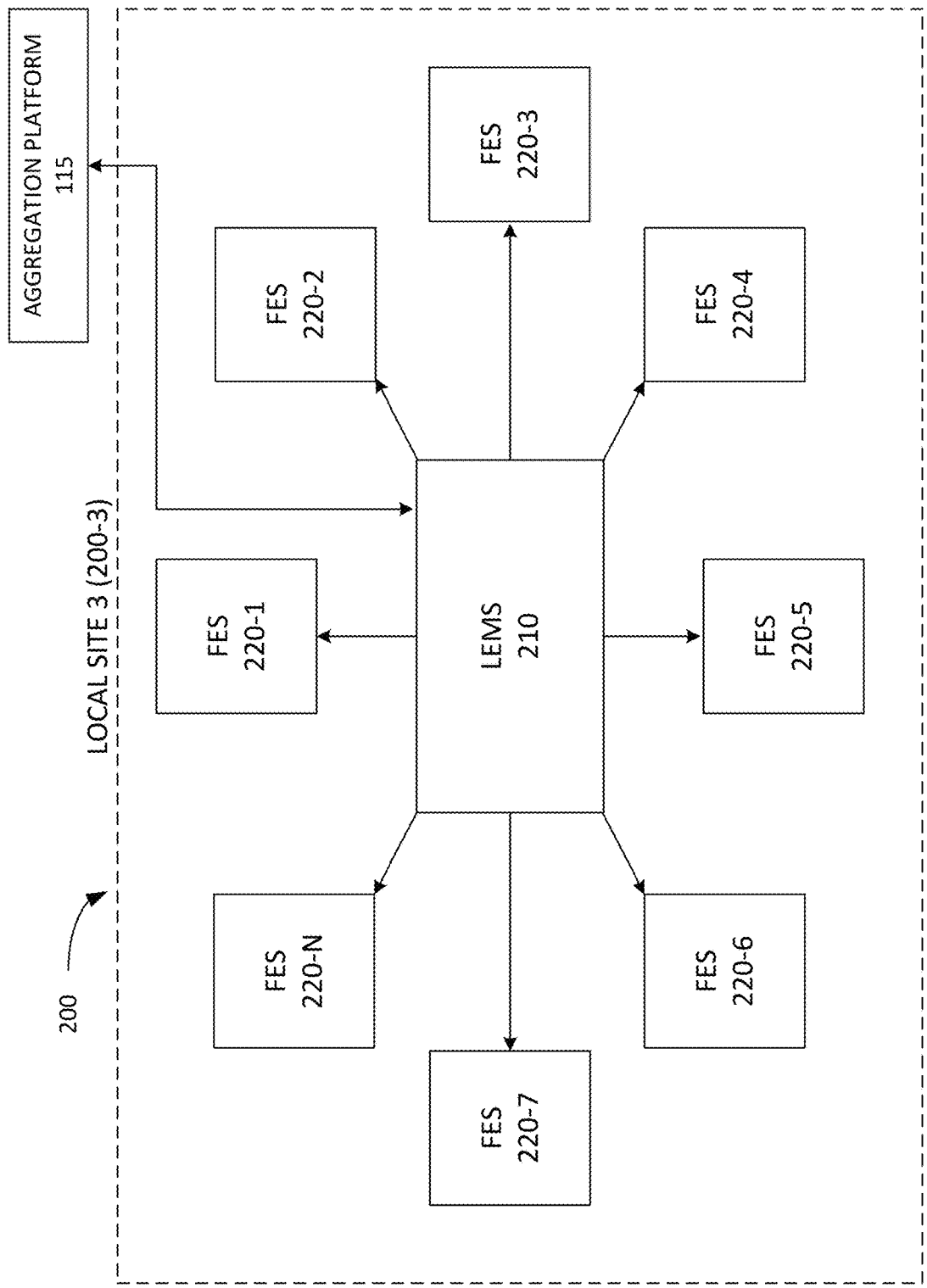
FIG. 18 depicts a LEMS-FES Local Power Topology.

FIG. 18 depicts a FES Local Power Topology at local site 3 (200-3) having multiple FES systems 220 in communication and under the control of the LEMS 210. In the multi-FES configuration, the system 200 and LEMS 210 may effectively manage and control a plurality of fixed energy storage systems (FES's 220-1 ... 220-N), including but not limited to a mixture and combination of fixed energy systems of varying foot print, power capacity, and performance capabilities. The LEM-FES system may have a fixed number of FES's based on space availability and zoning regulations at the local site. The aggregation platform 115 in connection with the LEMS 210 may identify the FES power topology and power delivery capabilities based on its configuration (i.e., FES only system), allowing tailored objectives to be conveyed to this site. For example, since the FES systems can support supply and load demands, the aggregation platform 115 may transmit objectives including groups of charging and discharging instructions to the LEMS 210 which, in response, generates and delivers set point commands to one or more FES (220-1 . . . 220-N).

Figure 19:
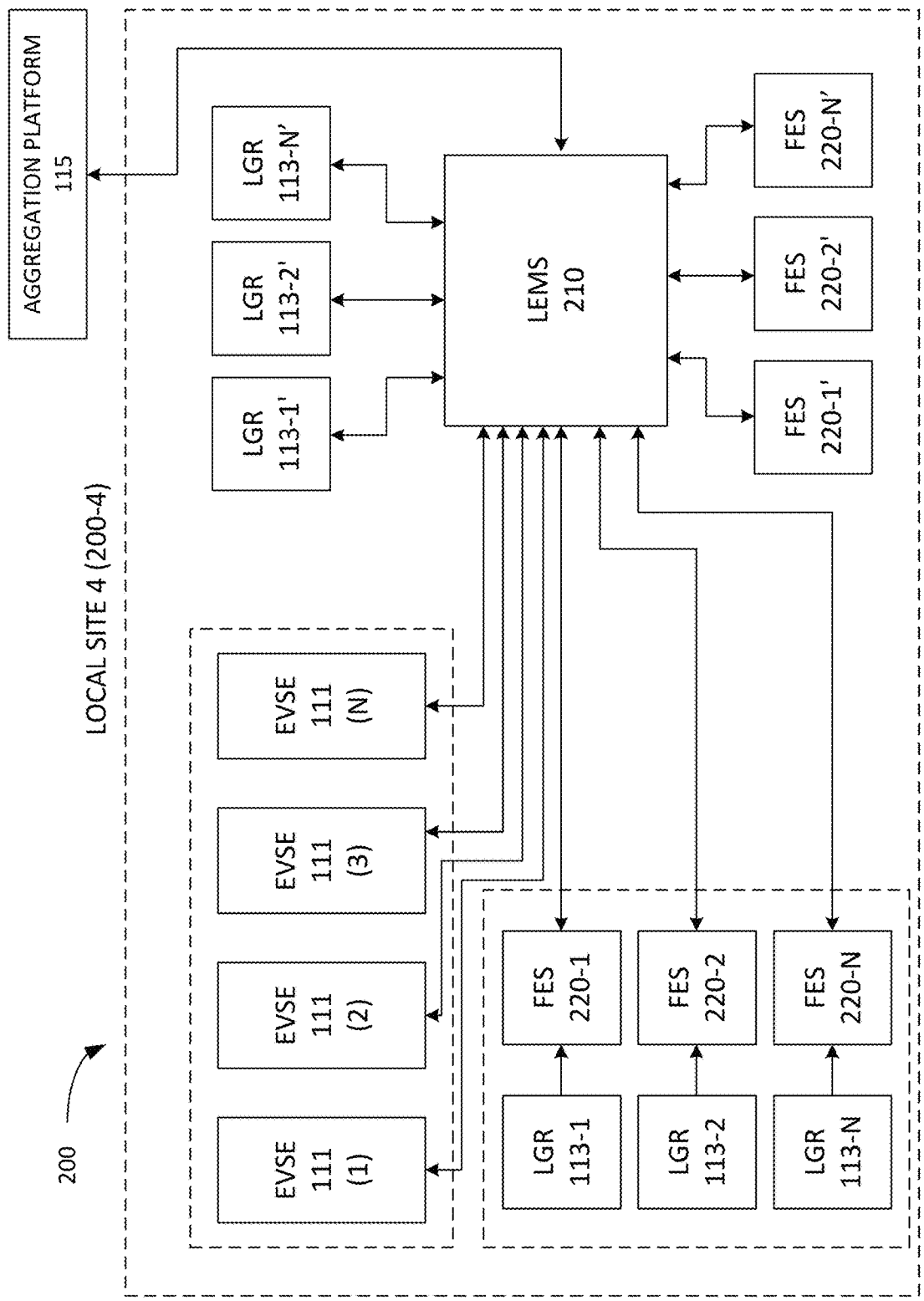
FIG. 19 depicts a LEMS Multi-Mixed Local Power Topology.

FIG. 19 depicts a Multi-Mixed Local Power Topology at local site 4 (200-4) having multiple groups of varying types of local power generating assets in communication and under the control of the LEMS 210. In the multi-mixed mode configuration, the system 200 and LEMS 210 may effectively manage and control an array of EVSEs, FES's, and LGR's, including but not limited to a mixture and combination of EVSEs, FES's, and LGR's having varying foot prints, sizes, power capacity, and performance capabilities. The LEM-multi-mixed mode system may have a fixed quantity of power generation assets based on space availability and zoning regulations at the local site. The aggregation platform 115 in connection with the LEMS 210 may identify the LEM-multi-mixed mode topology and power delivery capabilities based on its configuration (i.e., multi-mixed mode system), allowing custom objectives to be conveyed to the local site. In addition, since the multi-mixed mode can support a myriad of supply and load demands, the aggregation platform 115 may transmit objectives including groups of charging and discharging instructions to the LEMS 210 which, in response, generates and delivers set point commands or group functions of set point commands to one or more each local power generating asset at the site.

Figure 20:
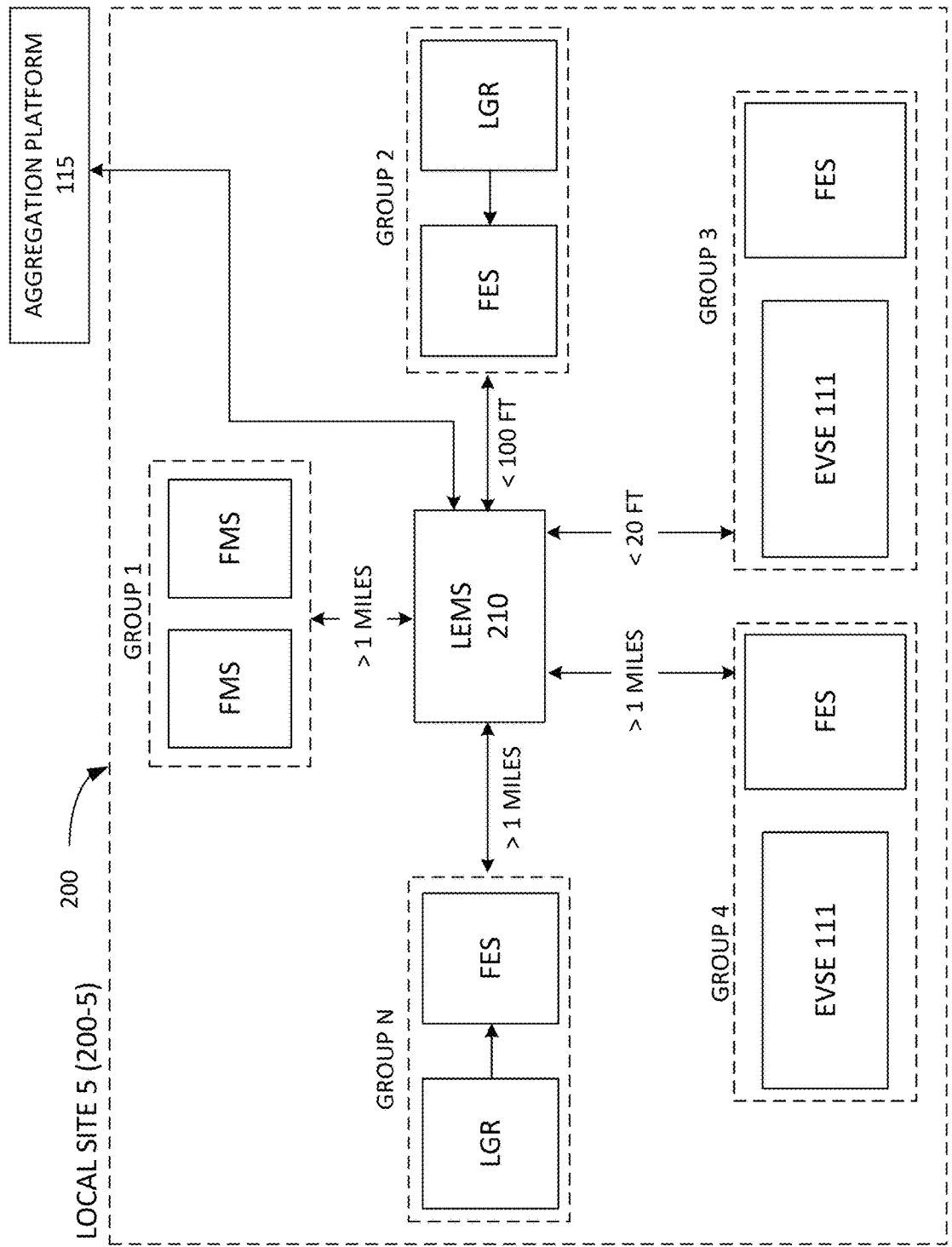
FIG. 20 depicts a Distributed Local Assets-Power Topology controlled and managed by a single LEMS.

FIG. 20 depicts a Distributed Local Assets (DLAs)-Power Topology controlled and managed by the LEMS 210. In the DLA-Power Topology, a single LEMS 210 may control groups of local power generating assets spread across local site 5 (200-5). The local site is not limited in size and may span across varying distances where groups of local power generating assets may be separated either by feet or by miles within the local site. For example, some exemplary local sites may include mid to large areas such as but not limited to university campuses, shopping and town centers, community centers, municipalities, government facilities, and the like. The aggregation platform 115 in connection with the LEMS 210 may identify the DLA-power topology and power delivery capabilities based on its configuration (i.e., DLA system), allowing custom objectives to be conveyed to the local site. In addition, since the DLA-power topology can support a myriad of supply and load demands, the aggregation platform 115 may transmit objectives including groups of charging and discharging instructions to the LEMS 210 which, in response, generates and delivers set point commands or group functions of set point commands to one or more each local power generating asset at the site.

Figure 21:
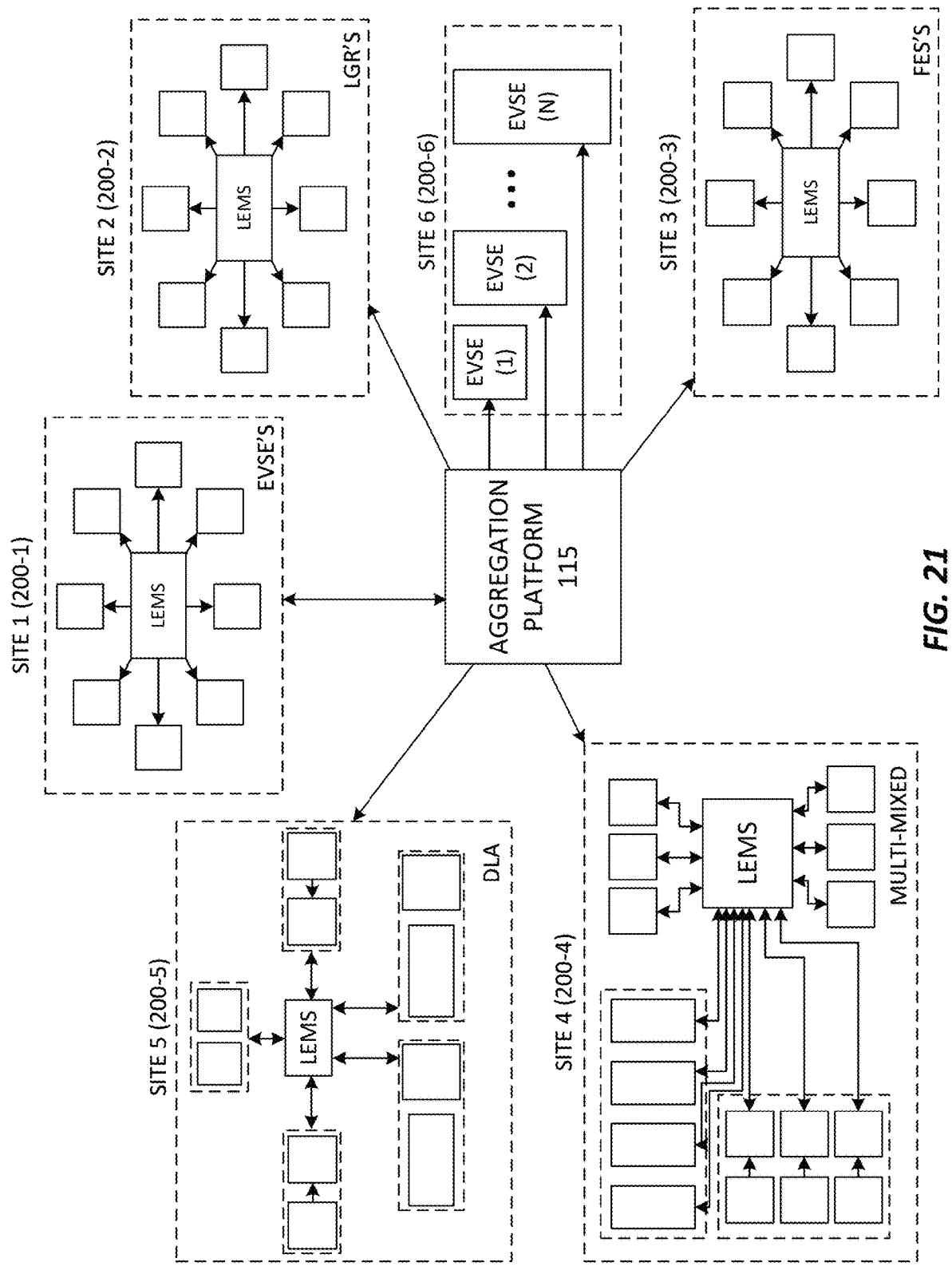
FIG. 21 depicts a heterogeneous combination of LEMS power topologies in communication with the aggregation platform.

FIG. 21 depicts a heterogeneous combination of LEMS power topologies in communication with the aggregation platform 115. In this embodiment, the aggregation platform 115 may generate objective commands to the LEMS of each power topology, including but not limited to the EVSE Local Power Topology, the LGR Local Power Topology, the FES Local Power Topology, the Multi-Mixed Local Power Topology, and the Distributed Local Assets (DLA)-Power Topology. In another embodiment, groups of EVSEs at another local site (200-6) may be in direct communication and control by the aggregation platform 115. Each power topology at their respective site may support a myriad of supply and load demands from the grid 101. The aggregation platform 115 in connection with each LEMS 210 may identify and acquire the type of power topology scheme and power delivery capabilities at each site based on data received at the inputs sub-block 210-1 of each LEMS 210. Based on the power topology scheme, power supply and load capabilities at each power topology, an array of custom objectives may be conveyed to each power topology by the aggregation platform 115. These objectives may include groups of charging and discharging instructions tailored for each LEMS 210 which, in response, generates and delivers set point commands or group functions of set point commands to one or more each local power generating asset at the local site level.

The foregoing power topologies presented herein provide several examples of possible internal configurations and layout schemes of the LEMS, local power generating assets, subcomponents, devices, and interconnections therein at one or more local mixed power generation sites. However, such examples are not meant to limiting in scope in terms of the number, size, capacity, geographic location, interconnection, or properties of local assets, systems, subsystems, and or devices operating at each site. In addition, power topologies described above may include other variants, combinations, and numbers of local assets (EVSEs, FES, LGRs). Furthermore, the LEMS may operate with other types of local power generating systems regardless of size, location, or power capacity including, but not limited to, Facility Management Systems (FMS), thermal power generating systems, and fuel cell systems.

Dynamic and Synergistic System and Method for Controlling a Combination of Local Power Topologies In another embodiment, a dynamic and synergistic system and method for applying forward probability based learning executed by the external entity (e.g., aggregation platform 115) can control a combination of local power topologies having controllable local power generating assets (EVs, EVSEs, battery. LGR) at different site locations, and communicate real-time status information from one or more EVSE's to the external entity by which set points are determined and conveyed to each EVSE at the local level in order to satisfy objectives and grid service requirements.

In accordance to the control authority managing each power topology, the external entity may apply and/or negotiate operational control of one or more EVSEs with a LEMS at each local site. In some power topologies, the external entity may have full authority of the LEMS at some local sites, allowing the external entity to have complete power management over local assets at these local sites. In other power topologies, the LEMS may be under the authority of another external party through which the external entity must negotiate control prior to conveying set points and adjusting power settings to local assets at these other sites. In either case, once control of a local EVSE has been established by the external entity, set points are conveyed to the local EVSE to change its operational power state to satisfy one or more operating conditions related to objectives and grid service requirement. Note, the power topology discussed above is applicable but is not limited to power topologies presented in FIGS. 1, 2, 5-7, 16-21.

Figure 22:
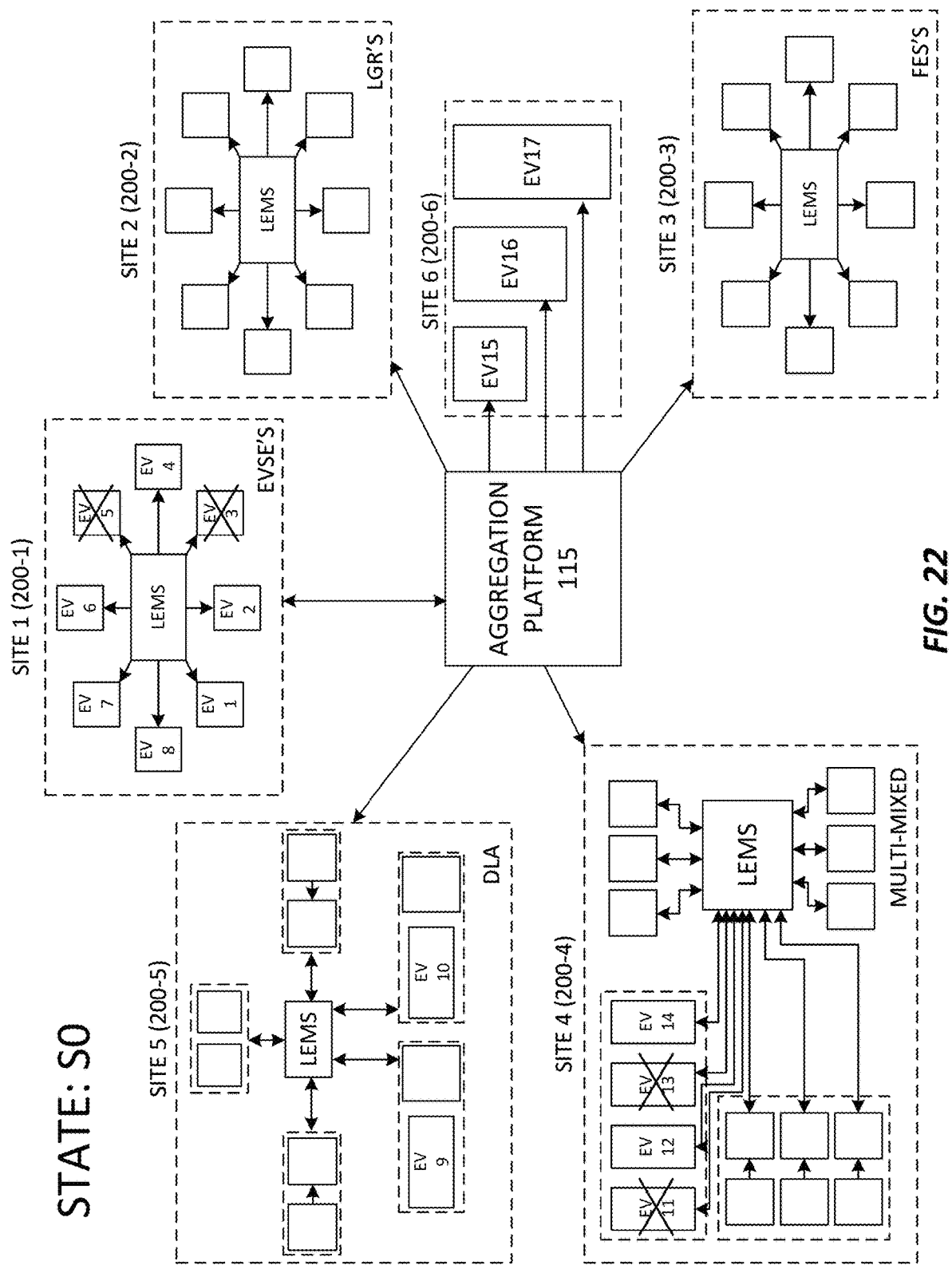
FIG. 22 depicts an example of status information obtained by the aggregation platform at the initial state S0 from the local power topologies.
Figure 23:
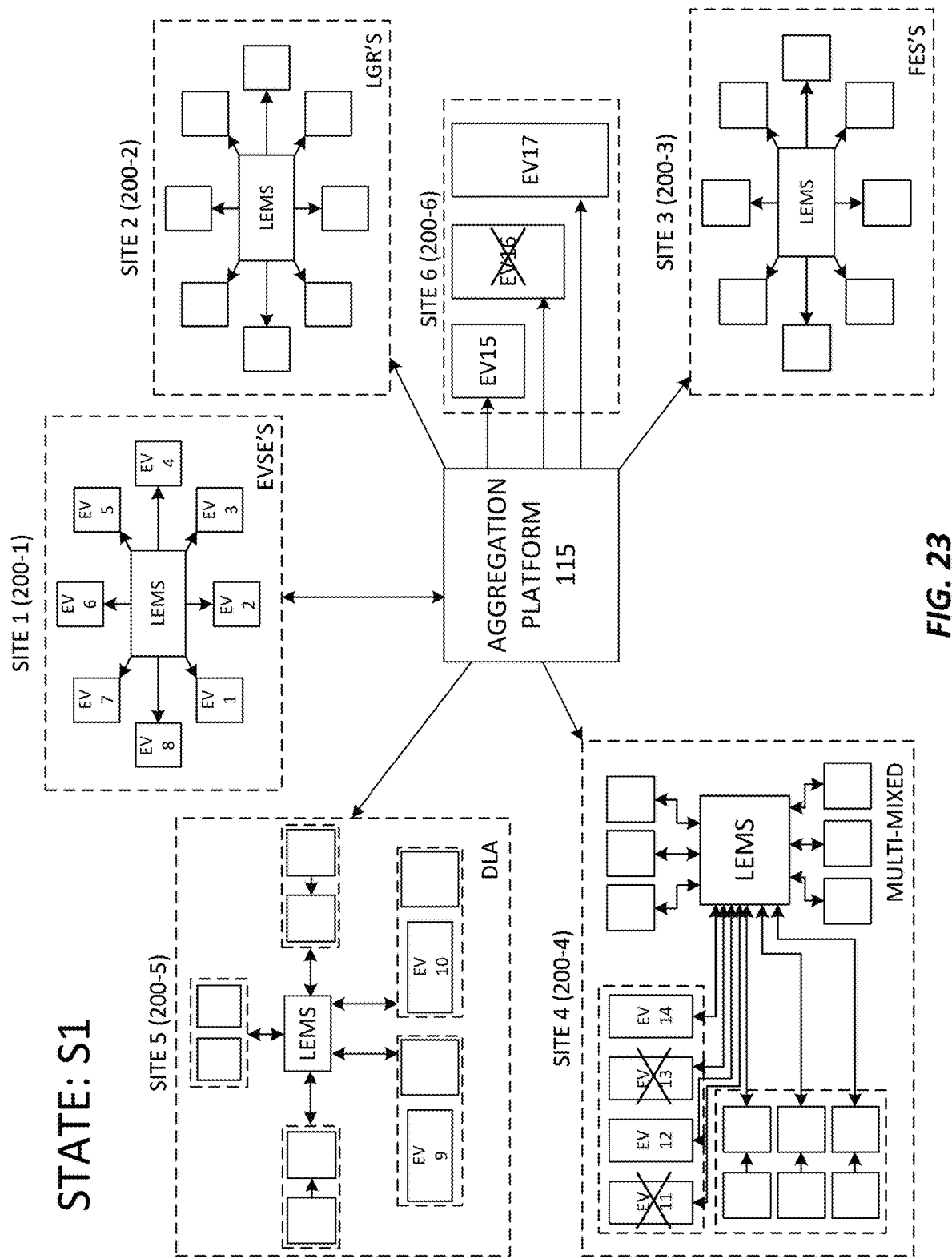
FIG. 23 depicts local power topologies at a future state S1.

Overall, the power generation and storage capabilities and capacities at each power topology can change over short periods of time where the power dynamics at the local site level have variable states, depending on the availability of EV's at the EVSEs, charging/discharging states of EVs, charging modes (unidirectional or bidirectional) of EVs, and available power capacities of the EV's. FIGS. 22-23 depict examples of possible states within each local power topology. For example, FIG. 22 illustrates the combination of local power topologies (200-1 to 200-6) at an initial state S0 at time T0, where the aggregation platform 115 can obtain in real-time all status information from EVs connected to EVSEs at each local site, including but not limited to EV power capacity, EV availability, EV charging modes, and so on. Based on the initial state S0, the aggregation platform 115 can predict and forecast future power generation and storage capabilities at each local site, generating an array of set point models that may be applied to local power generating assets disposed at each local site in order to meet objectives and grid service requirements. For example, at the initial state S0 shown in FIG. 22, the aggregation platform 115 may communicate with each local power topology (200-1 to 200-6) to obtain real-time status information of local power generating assets at each local site. This example is further illustrated in Table 4.0 which provides status information for each local asset (e.g., EV) obtained by the aggregation platform 115 at the initial state, S0.

TABLE 4.0

Example of Initial State, S0

| Local Power Site | Local Topology | Current Status Information (S0) | Set Points applied to targeted system (EV) | Objective, (PO) |
|---|---|---|---|---|
| Site 1 | EVSE's | EV1: (Available, 500 W, UNI)<br>EV2: (Available, 1500 W, BI)<br>EV3: (N/A)<br>EV4: (Available, 2000 W, BI)<br>EV5: (N/A)<br>EV6: (Available, 500 W, BI)<br>EV7: (Available, 2500 W, BI)<br>EV8: (Available, 3500 W, BI) | SP1-<br>(EV1,<br>EV2,<br>EV6) | PO1 |
| Site 2 | LGR's | N/A | N/A | |
| Site 3 | FES's | N/A | N/A | |
| Site 4 | Multi-Mixed | EV11: (N/A)<br>EV12: (Available, 500 W, BI)<br>EV13: (N/A)<br>EV14: (Available, 1000 W, BI) | SP4-<br>(EV14) | PO4 |
| Site 5 | DLA | EV9: (Available, 1000 W, UNI)<br>EV10: (Available, 1500 W, BI) | SP9-10<br>(EV10) | PO5 |
| Site 6 | EVSE's (direct connection) | EV15: (Available, 1000 W, UNI)<br>EV16: (Available, 500 W, BI)<br>EV17: (Available, 1500 W, UNI) | SP6-<br>(EV15) | PO6 |

Table 4.0 and FIG. 22 depicts an example of status information obtained by the aggregation platform 115 at the initial state S0 from the local power topologies, indicating site identification numbers, power topology types, availability of EV assets (E1-E17), EV power capacities, and EV mode capabilities. From the status information at the initial state S0, the aggregation platform 115 can generate and apply set points (SP1-SP6) to one or more targeted systems (e.g., EVs) adjusting one or more power settings and/or power modes of operation to satisfy one or more objectives (P01-P06) at each site level (200-1 to 200-6) as well as meeting an objective for the entire power topology. Furthermore, the aggregation platform 115 can perform a myriad of calculations based upon possible future states (S1, S2, SN) to determine set points producing an objective at those future states.

FIG. 23 illustrates the combination of local power topologies (200-1 to 200-6) at a possible future state S1 at time T1, where time T1>T0. At future state S1, many possible events may affect the power dynamics at each local site, including but not limited to the availability of local assets (EVs, EVSEs), EV power capacities, and EV mode capabilities. Table depicts new events at some of the local sites affecting the power dynamics at future state S1. For example, these events can include changes to the availability of local assets (EV3, EV5: Available, EV16: Unavailable), EV power capacity changes (EV6: −1 kW, EV8: −3 kW), and EV mode capability changes (EV1: UNI→BI, EV3: BI, EV8: BI→UNI).

TABLE 5.0

Example of Future State, S1, T1 (T1 > T0)

| Local Power Site | Local Topology | Future Status Information (S1) | Set Points applied to targeted system (EV) | Energy or Electrical Objective, (PO) |
|---|---|---|---|---|
| Site 1 | EVSE's | EV1: (Available, 500 W, BI)<br>EV2: (Available, 1500 W, BI)<br>EV3: (Available, 1000 W, BI)<br>EV4: (Available, 2000 W, BI)<br>EV5: (Available, 1500 W, UNI)<br>EV6: (Available, 1500 W, BI)<br>EV7: (Available, 2500 W, BI)<br>EV8: (Available, 500 W, UNI) | SP1-<br>(EV2,<br>EV4,<br>EV8) | PO1 |
| Site 2 | LGR's | N/A | N/A | |
| Site 3 | FES's | N/A | N/A | |
| Site 4 | Multi-Mixed | EV11: (N/A)<br>EV12: (Available, 500 W, BI)<br>EV13: (N/A)<br>EV14: (Available, 1000 W, BI) | SP4-<br>(EV12,<br>EV14) | PO4 |
| Site 5 | DLA | EV9: (Available, 1000 W, UNI)<br>EV10: (Available, 1500 W, BI) | SP9-10<br>(EV9,<br>EV10) | PO5 |
| Site 6 | EVSE's (direct connection) | EV15: (Available, 1000 W, UNI)<br>EV16: (N/A)<br>EV17: (Available, 1500 W, UNI) | SP6-<br>(EV15) | PO6 |

Figure 24:
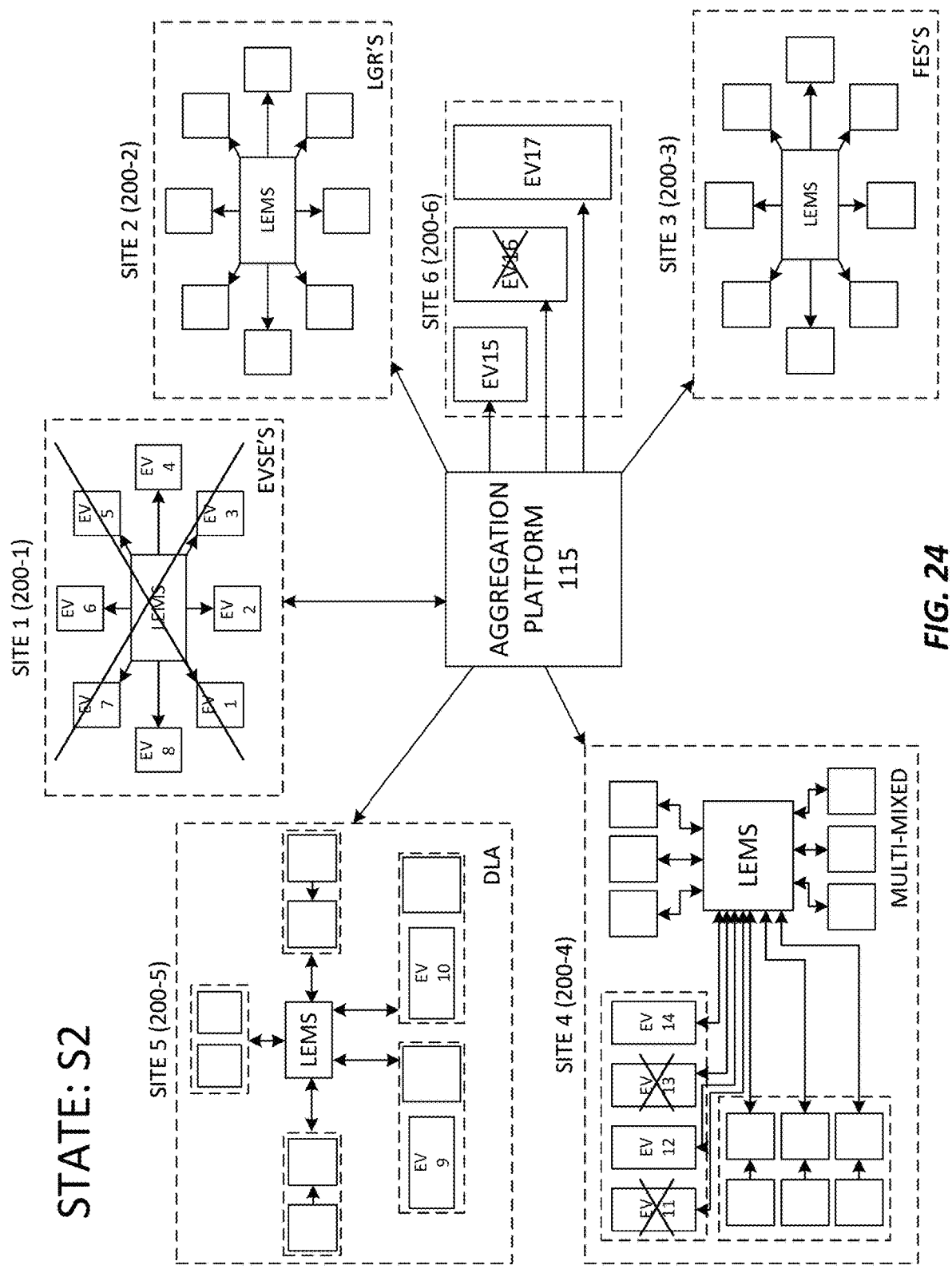
FIG. 24 depicts local power topologies at a subsequent future state S2.

FIG. 24 illustrates the combination of local power topologies (200-1 to 200-6) at a possible future state S2 at time T2, where time T2>T1. In addition to changes attributed to the individual local assets (e.g., EV1-EV17), system level changes at the local site may occur which may enhance or diminish the power dynamics of the entire power topology. For example, as shown in FIG. 24 and in Table 6.0, power availability at local site 1 (200-1) is no longer in service and available to the aggregation platform 115 for grid services.

TABLE 6.0

Example of Future State, S2, T2 (T2 > T1)

| Local Power Site | Local Topology | Future Status Information (S2) | Set Points applied to targeted system (EV) | Energy or Electrical Objective, (PO) |
|---|---|---|---|---|
| Site 1 | EVSE's | EV1: (N/A)<br>EV2: (N/A)<br>EV3: (N/A)<br>EV4: (N/A)<br>EV5: (N/A)<br>EV6: (N/A)<br>EV7: (N/A)<br>EV8: (N/A) | N/A | PO1 |
| Site 2 | LGR's | N/A | N/A | |
| Site 3 | FES's | N/A | N/A | |
| Site 4 | Multi- | EV11: (N/A) | SP4- | PO4 |

TABLE 6.0-continued

Example of Future State, S2, T2 (T2 > T1)

| Local Site | Local Power Topology | Future Status Information (S2) | Set Points applied to targeted system (EV) | Energy or Electrical Objective, (PO) |
|---|---|---|---|---|
| | Mixed | EV12: (Available, 500 W, BI) EV13: (N/A) EV14: (Available, 1000 W, BI) | (EV12, EV14) | |
| Site 5 | DLA | EV9: (Available, 1000 W, UNI) EV10: (Available, 1500 W, BI) | SP9-10 (EV9, EV10) | PO5 |
| Site 6 | EVSE's (direct connection) | EV15: (Available, 1000 W, UNI) EV16: (N/A) EV17: (Available, 1500 W, UNI) | SP6- (EV15, EV17) | PO6 |

It is noted that the states S0-S2 disclosed above present only a few examples out of a countless number of states that affect the power dynamics at each local power topology as well as the entire power topology as a whole. Based on an initial state S0 and dynamic prediction models and methods, the aggregation platform 115 can account for a myriad of power dynamics for determining objectives for local power topologies at future states.

Figure 25:
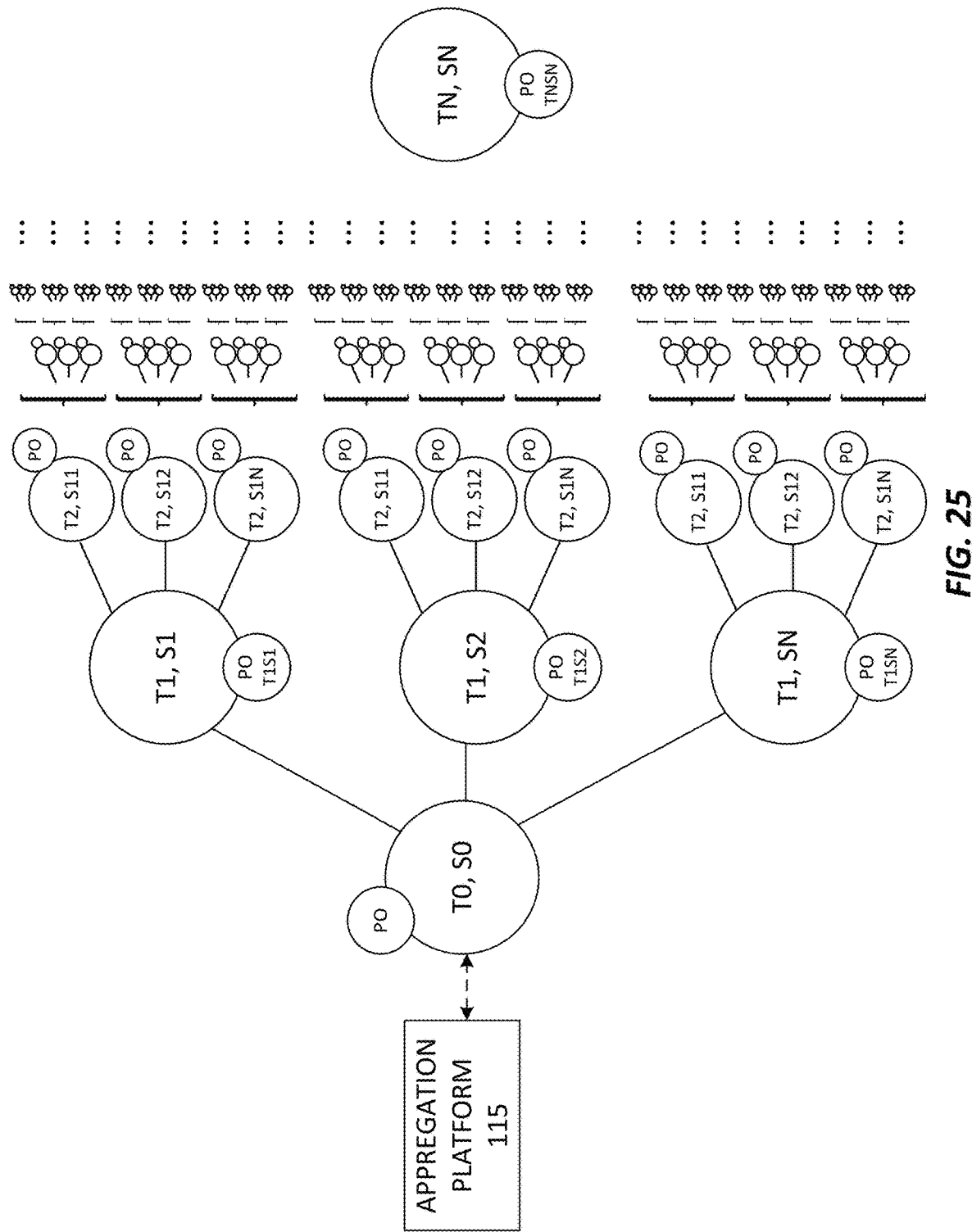
FIG. 25 depicts a diagram of a multitude of states starting at an initial state S0 by which the aggregation platform may dynamically predict, determine, and calculate set points in order to meet certain energy or electrical objectives.

FIG. 25 depicts a diagram of a multitude of states starting at an initial state S0 by which the aggregation platform 115 may dynamically predict, determine, and calculate set points in order to meet energy or electrical objectives, including but not limited to objectives based upon grid-wide level conditions, local-level conditions, best mix of EVSE's, maximum revenue generation, different time horizons, and/or other grid service requirements. In addition, future states S1, S2, ... SN are generally dependent on power setting changes made by the aggregation platform 115 at previous states as well as any event which affects changes in the power dynamics at each local site. Furthermore, the aggregation platform 115 may implement and execute forward probability based learning and perform future state permutations to calculate set points to achieve one or more desired grid service objectives.

Certain LEMS Advantages

An advantage of LEMS 210 is its intelligent awareness and ability to facilitate energy management at the local site level by controlling and leveraging a mixture of local assets (EVSEs and LGR) deployed at the local site, and combining a mixture of generated power from each site which acts as its own virtual power plant for delivering grid services to the grid 101. In addition, the LEMS 210 has the ability to effectively handle and fulfill objectives of the grid services, including regulation or demand response objectives from the grid 101, by conveying operational set points that control the power charge and discharge at each local asset in order to meet those objectives. In another advantage, the LEMS 210 has the ability to calculate the set points to power capacity needed in real-time at the local site based on input data and sensing data it receives from the local assets and subcomponents. In addition, objectives for grid services could be measured in front of the sensing meters or behind the sensing meters, providing the LEMS 210 multiple targets for formulating, generating, and then conveying operational set points to the local assets in response these objectives. Furthermore, the LEMS 210 can regulate the local assets that are controllable and, in some cases, acquire input data from local assets that cannot be controlled, making decisions and generating set points which affect local assets (both controllable and uncontrollable) in order to meet the objectives at the local site 200. Grid services may be influenced by loads to the grid originating from power consumed by residential housing, commercial buildings, and industrial facilities or surplus power to the grid stemming from power supplied by solar power, wind power, or other power generating sources, thereby determining objectives for each site. Overall, the LEMS 210 can facilitate energy management at the local site level, effectively meeting the dynamic nature and objectives of grid services, in response to load and surplus demands to the grid 101, for the purposes of bill savings and revenue generation at each local site (200-1 to 200-n).

ADDITIONAL CONSIDERATIONS

The preceding description is provided to enable any person skilled in the art to practice the various implementations described herein. The examples discussed herein are not limiting of the scope, applicability, or implementations set forth in the claims. Various modifications to these implementations will be readily apparent to those skilled in the art, and the generic principles defined herein may be applied to other implementations. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the implementations shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A local microgrid system electrically coupled to a power grid, the local microgrid system comprising:
   a plurality of local power generating assets at a local site, the plurality of local power generating assets including:
      at least one electrical vehicle station equipment (EVSE) configured to communicate with an electrical vehicle (EV);
      at least one local generation resource (LGR) comprising a solar, wind, geothermal, and/or hydro power generating system; and
      at least one fixed energy storage (FES) system comprising batteries, battery packs, capacitors, and/or energy storage cells, wherein the at least one FES system is configured to provide the local site with a local power source for delivering and receiving bidirectional power to and from the grid over power lines via an inverter and a distribution system;
   a plurality of sensing meters including:
      a grid sensing meter in communication with the power grid, the grid sensing meter associated with the local site;
      an EVSE sensing meter in communication with the at least one EVSE;
      an LGR sensing meter in communication with the at least one LGR; and
      an energy storage sensing meter in communication with the at least one FES system; and
   a local energy management system (LEMS) configured to:
      receive data inputs from the plurality of sensing meters,
      transfer power between the plurality of local power generating assets and the power grid by controlling the plurality of local power generating assets based on the data inputs from the plurality of sensing meters, and
      based on the data inputs received from the plurality of sensing meters, automatically adjust one or more operational parameter settings of a target member of the plurality of local power generating assets according to a combination of one or more operating parameter set points received by the target member.

2. The local microgrid system of claim 1, wherein the at least one EVSE is configured to transmit power bidirectionally with the at least one EVSE.

3. The local microgrid system of claim 1, further comprising an external entity that communicates energy or electrical objectives to the LEMS.

4. The local microgrid system of claim 3, wherein the external entity comprises an aggregation platform, frequency meter, energy meter, or a third party system.

5. The local microgrid system of claim 4, wherein the external entity is the aggregation platform, the LEMS further configured to receive commands from the aggregation platform.

6. The local microgrid system of claim 3, wherein the LEMS is further configured to receive one or more energy or electrical objectives from the external entity.

7. The local microgrid system of claim 1, wherein the LEMS is further configured to internally determine one or more energy or electrical objectives based on the data inputs from the plurality of sensing meters.

8. The local microgrid system of claim 7, wherein the one or more energy or electrical objectives comprise one or more of the following requirements in response to a grid condition:
   supply or demand requirements in power factor, voltage, current, frequency, reactive/active power, energy, and/or phase angle;
   power delivery requirements in relation to deviations in grid supply and/or demand conditions;
   requirements to meet target energy consumption or target power limit; and/or grid balancing requirements.

9. The local microgrid system of claim 1, wherein the LEMS is further configured to control the plurality of local power generating assets further based on one or more energy or electrical objectives.

10. The local microgrid system of claim 9, wherein the LEMS is further configured to determine one or more operating parameter set points to the plurality of local power generating assets to meet the one or more energy or electrical objectives.

11. The local microgrid system of claim 9, wherein the LEMS is further configured to determine one or more future energy or electrical objectives for the local site at one or more future states.

12. The local microgrid system of claim 11, wherein the LEMS is further configured to determine one or more future operating parameter set points to the plurality of local power generating assets based at least in part on the one or more future energy or electrical objectives.

13. The local microgrid system of claim 11, wherein the LEMS is further configured to predict changes to the local site at the one or more future states based on the data inputs from the plurality of sensing meters at a present state and dynamic prediction models.

14. The local microgrid system of claim 13, wherein the changes to the local site at the one or more future states comprise changes attributed to the plurality of local power generating assets.

15. The local microgrid system of claim 13, wherein the changes to the local site at the one or more future states comprise system level changes at the local site.

16. The local microgrid system of claim 1, wherein the LEMS is physically present at the local site.

17. The local microgrid system of claim 1, wherein the LEMS is located in a remote server physically separated from the local site.

18. The local microgrid system of claim 1, further comprising:
- at least one building; and
- a Facilities Management System (FMS) that communicates with the LEMS to control power flow from the EVSE to the at least one building.

* * * * *